(12) United States Patent
Borremans et al.

(10) Patent No.: US 12,523,528 B2
(45) Date of Patent: Jan. 13, 2026

(54) SPECTRAL SENSOR SYSTEM WITH SPATIALLY MODIFIED CENTER WAVELENGTHS

(71) Applicant: Spectricity, Mechelen (BE)

(72) Inventors: Jonathan Borremans, Lier (BE); Maarten De Bock, Ghent (BE); Ward van der Tempel, Keerbergen (BE)

(73) Assignee: Spectricity, Mechelen (BE)

(*) Notice: Subject to any disclaimer, the term of this patent is extended or adjusted under 35 U.S.C. 154(b) by 121 days.

(21) Appl. No.: 18/315,872

(22) Filed: May 11, 2023

(65) Prior Publication Data
US 2023/0280210 A1  Sep. 7, 2023

Related U.S. Application Data

(62) Division of application No. 17/302,465, filed on May 4, 2021, now Pat. No. 11,650,099.
(Continued)

(51) Int. Cl.
*G01J 3/26* (2006.01)
*G01J 3/12* (2006.01)
(Continued)

(52) U.S. Cl.
CPC ............. *G01J 3/26* (2013.01); *G01J 3/2823* (2013.01); *G02B 5/285* (2013.01); *G01J 2003/1213* (2013.01); *G01J 2003/1226* (2013.01)

(58) Field of Classification Search
CPC .......... G01J 3/26; G01J 3/2823; G01J 3/0229; G01J 3/12; G01J 3/28; G01J 3/2803;
(Continued)

(56) References Cited

U.S. PATENT DOCUMENTS 7,561,194 B1  7/2009  Luo
8,471,921 B1  6/2013  Li
(Continued)

FOREIGN PATENT DOCUMENTS

CN  101069190 A  11/2007
CN  102037734 A  4/2011
(Continued)

OTHER PUBLICATIONS

China National Intellectual Property Administration; Office Action; Application No. 202110585686.5; Feb. 8, 2024; 20 pgs.
(Continued)

*Primary Examiner* — Michael A Lyons
(74) *Attorney, Agent, or Firm* — Katz Ruby & Carle LLP; Kelly H. Hale

(57) ABSTRACT

A sensor system has a plurality of optical sensors configured in an array on an integrated circuit and a lens system located proximal to a top surface of the array, where the intersection of the optical axis of the lens system with the plurality of optical sensors defines a reference point for light passing through the lens system. The sensor system includes a plurality of sets of optical filters overlaying the array between the lens system and the array, with each set of optical filters being associated with a set of optical sensors of the plurality of optical sensors and a set of optical filters of the plurality of sets of optical filters includes a plurality of optical filters where each set of optical filters has a center wavelength for light transmitted through the set of optical filters. In the sensor system each optical filter of the plurality of optical filters is configured to pass light in a different wavelength range, with at least some sets of optical filters configured to provide a center wavelength that is higher than a center wavelength of a set of optical filters at the reference point. An interface is provided for receiving output signal
(Continued)

representative of received light from the optical sensors and to output signal from the plurality of optical sensors, with the output signal being representative of received light from the plurality of optical sensors and a spectral response is determined for each set of optical sensors associated with a set of optical filters.

20 Claims, 33 Drawing Sheets

Related U.S. Application Data

(60) Provisional application No. 63/143,546, filed on Jan. 29, 2021, provisional application No. 63/066,507, filed on Aug. 17, 2020, provisional application No. 63/047,084, filed on Jul. 1, 2020, provisional application No. 63/031,298, filed on May 28, 2020.

(51) Int. Cl.
*G01J 3/28* (2006.01)
*G02B 5/28* (2006.01)

(58) Field of Classification Search
CPC ............. G01J 3/0205; G01J 2003/1213; G01J 2003/1226; G01J 2003/1217; G01J 2003/123; G01J 2003/2806; G01J 2003/2866; G02B 5/285; G02B 5/288
See application file for complete search history.

(56) References Cited

U.S. PATENT DOCUMENTS

| | | | |
|---|---|---|---|
| 11,650,099 B2* | 5/2023 | Borremans | G01J 3/0229 356/451 |
| 2003/0091232 A1 | 5/2003 | Kalevo | |
| 2008/0130031 A1 | 6/2008 | Dosluoglu | |
| 2009/0252411 A1 | 10/2009 | Siddiqui | |
| 2017/0339353 A1 | 11/2017 | Banachowicz | |
| 2017/0374306 A1 | 12/2017 | Vaartstra | |
| 2021/0072081 A1 | 3/2021 | Wang | |
| 2021/0239528 A1 | 8/2021 | Houck | |

FOREIGN PATENT DOCUMENTS

| | | |
|---|---|---|
| CN | 105451006 A | 3/2016 |
| CN | 105806796 A | 7/2016 |

OTHER PUBLICATIONS

China National Intellectual Property Administration; Office Action; Application No. 202110585686.5; Jul. 18, 2023; 11 pgs.

* cited by examiner

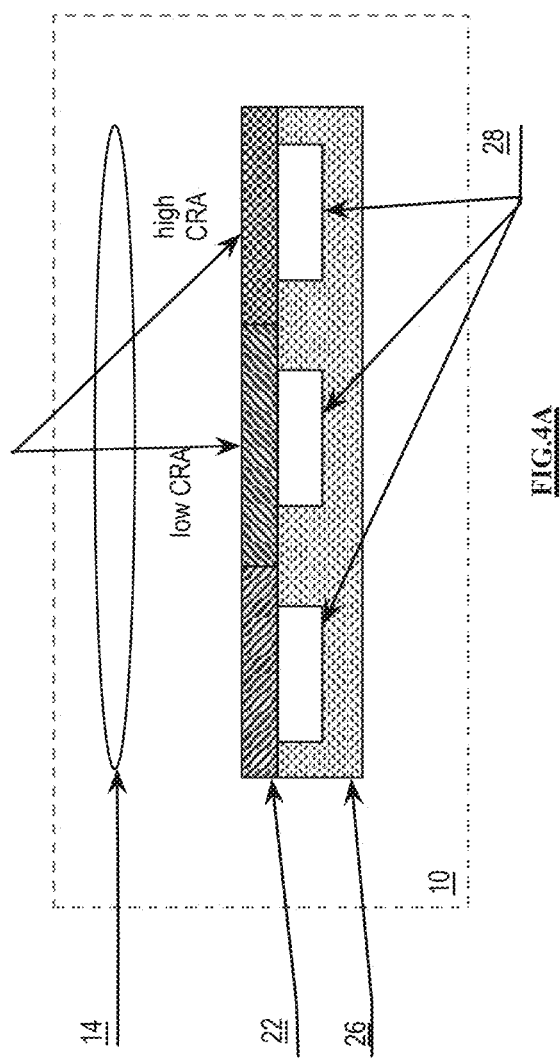

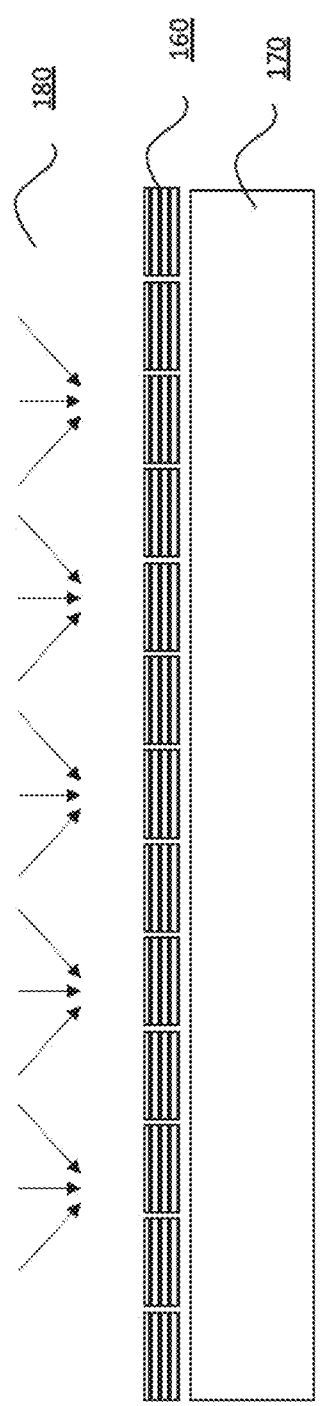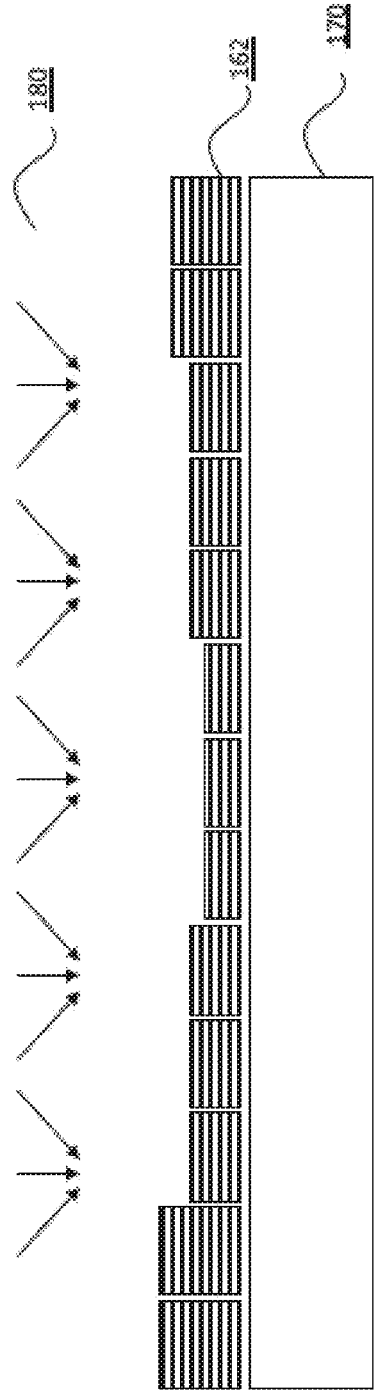

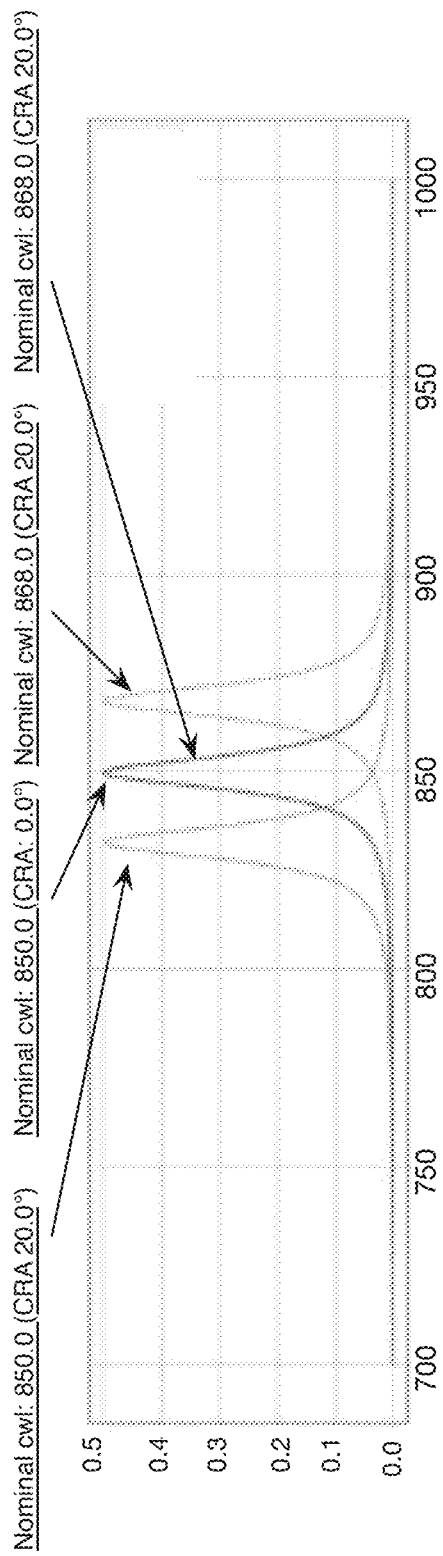
FIG. 5
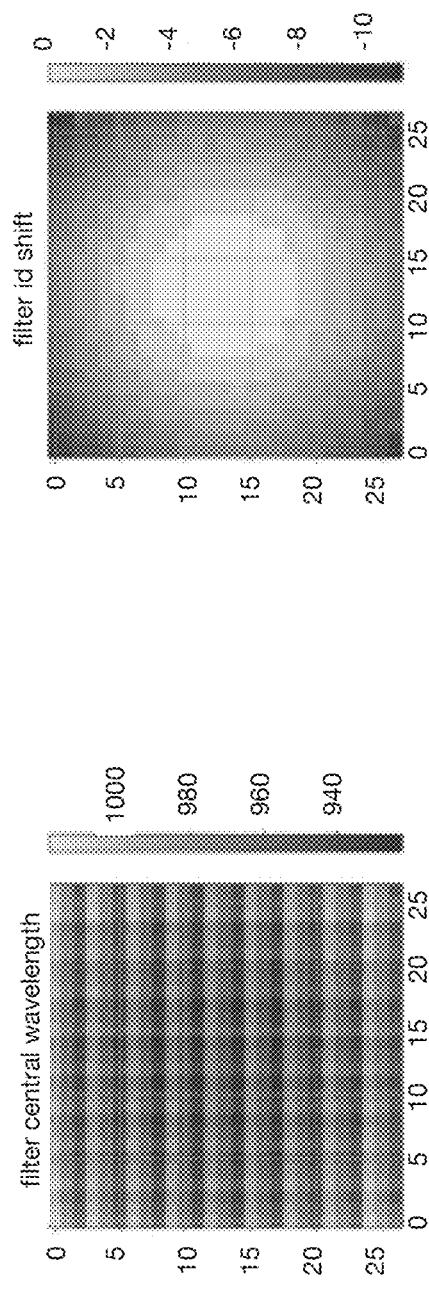
FIG. 6A
FIG. 6B

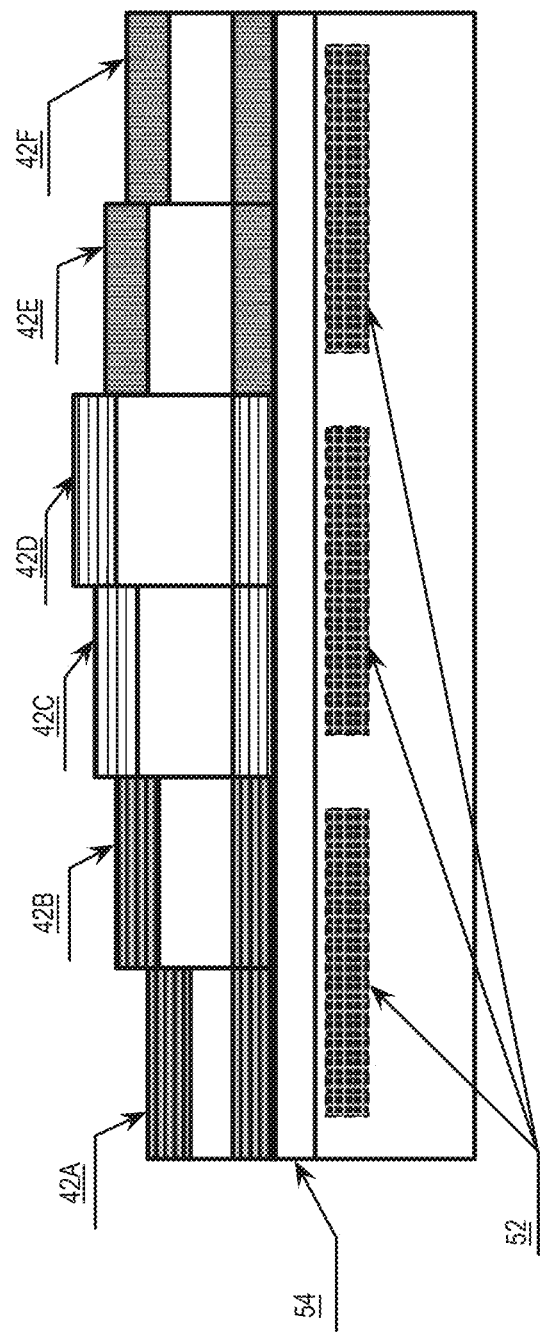

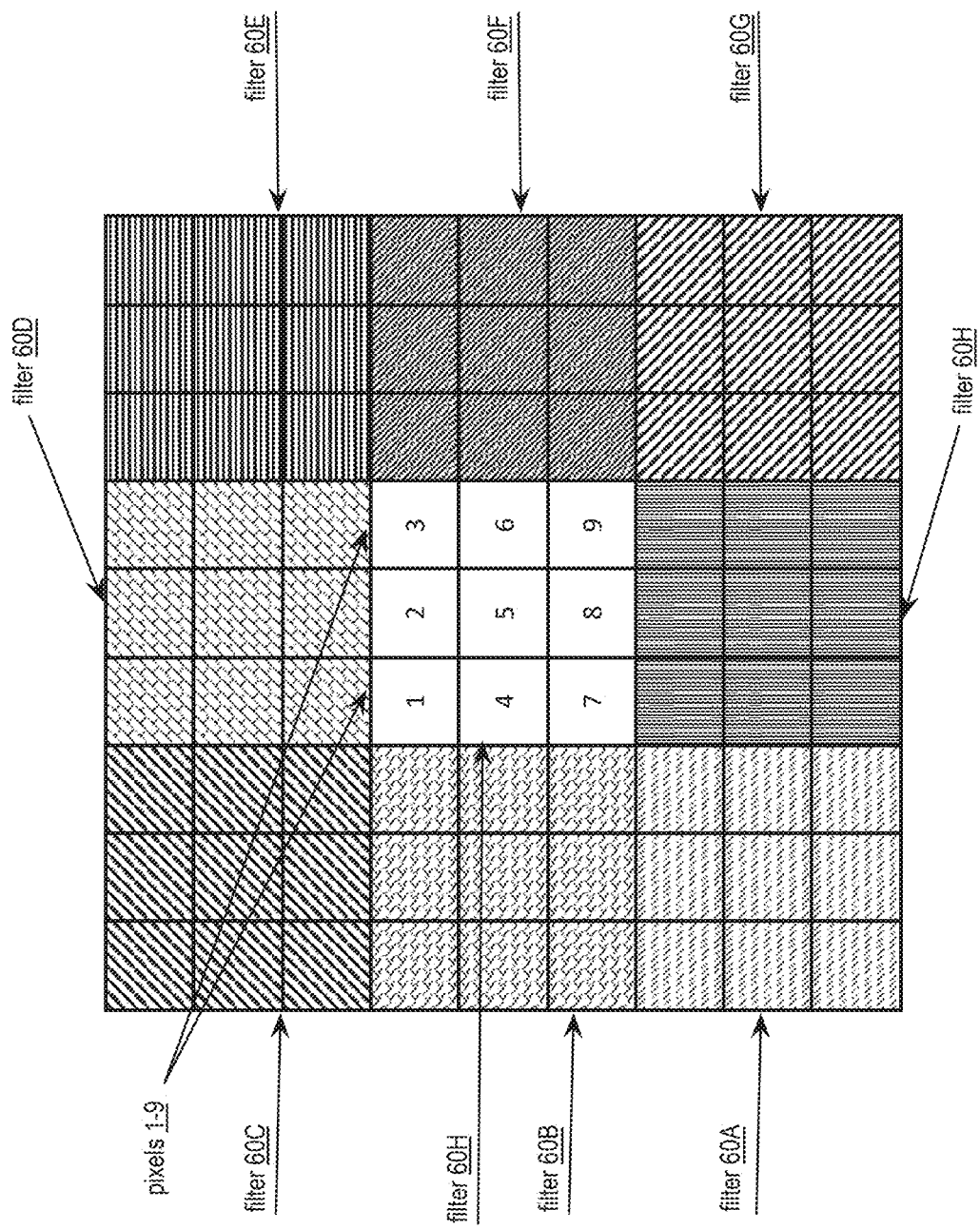

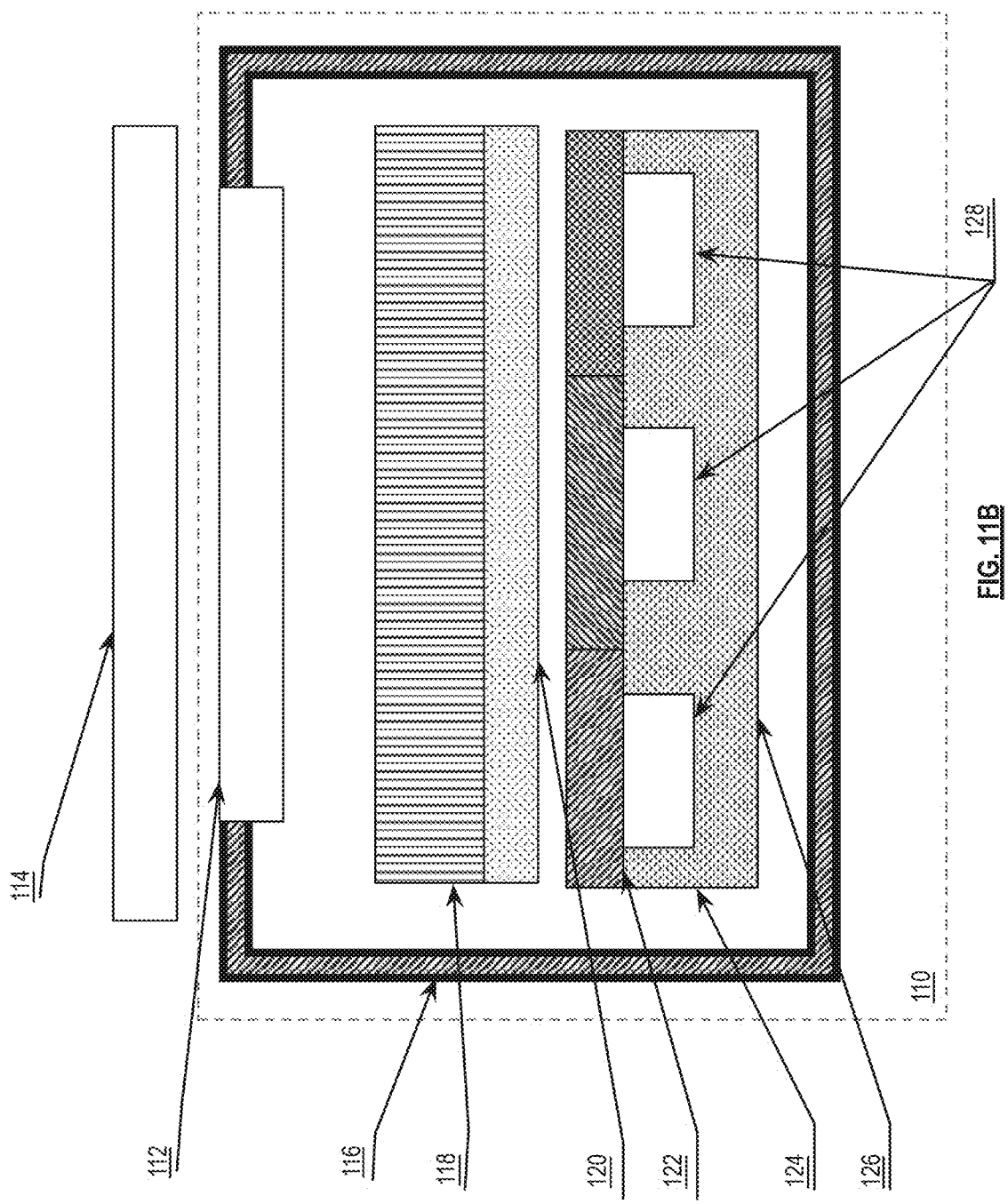

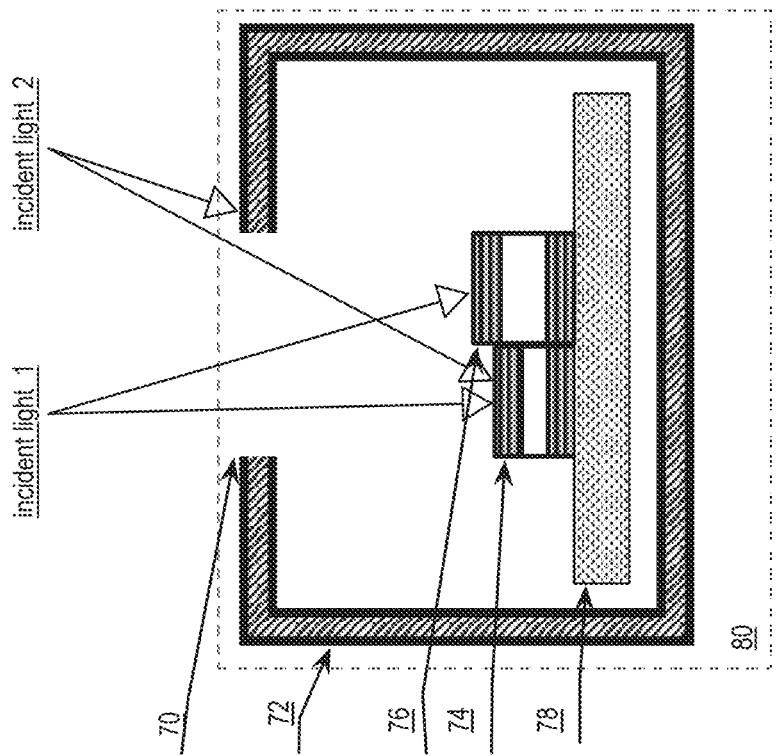
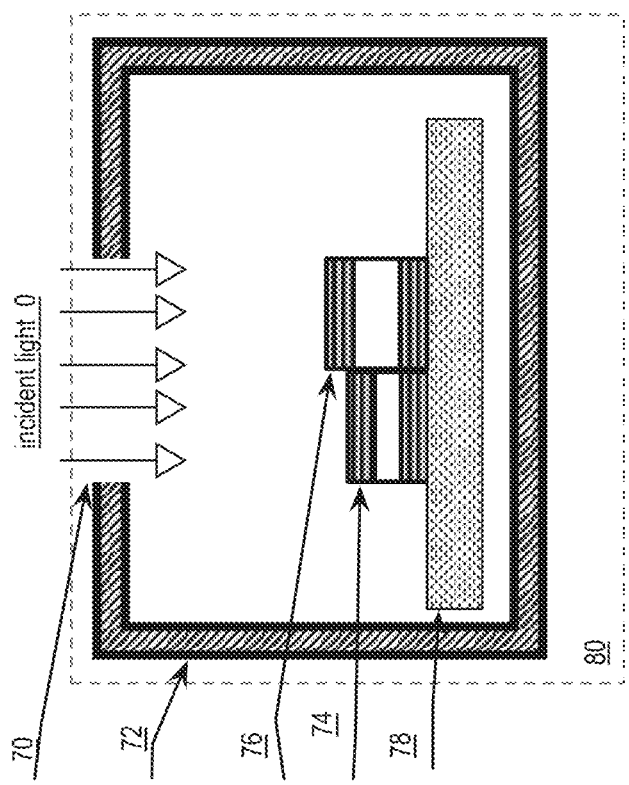
FIG. 12A
FIG. 12B

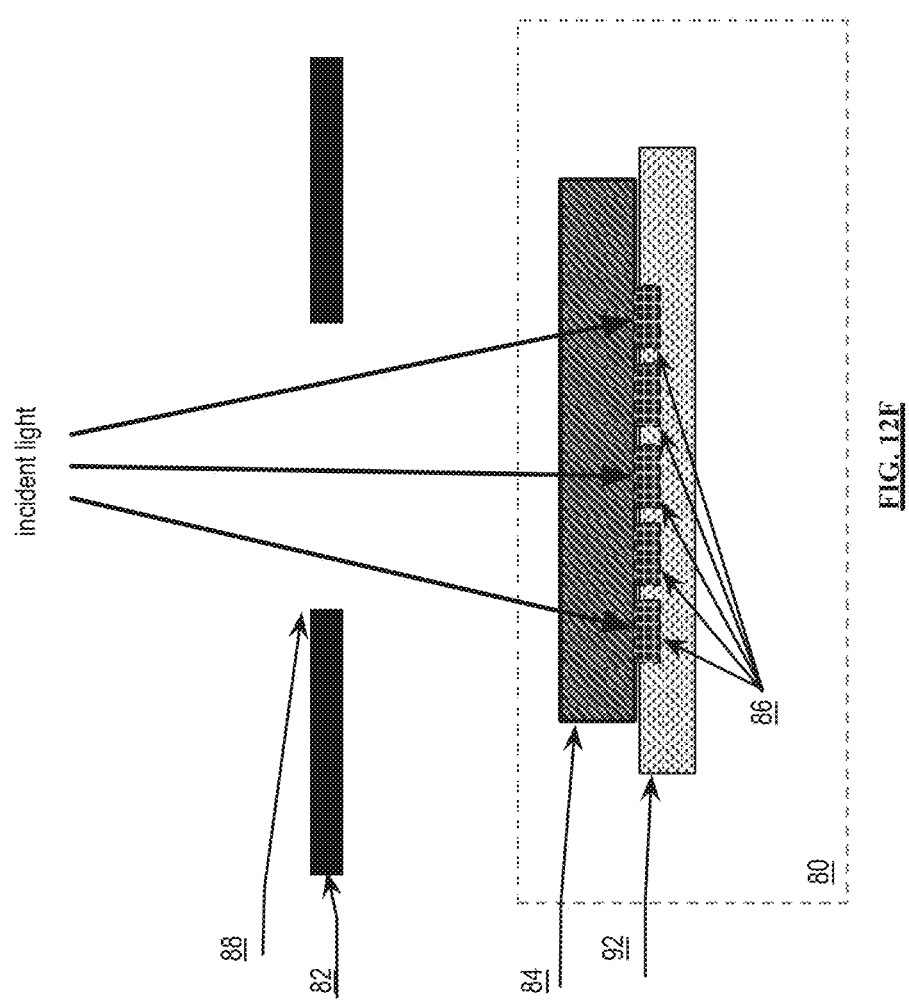

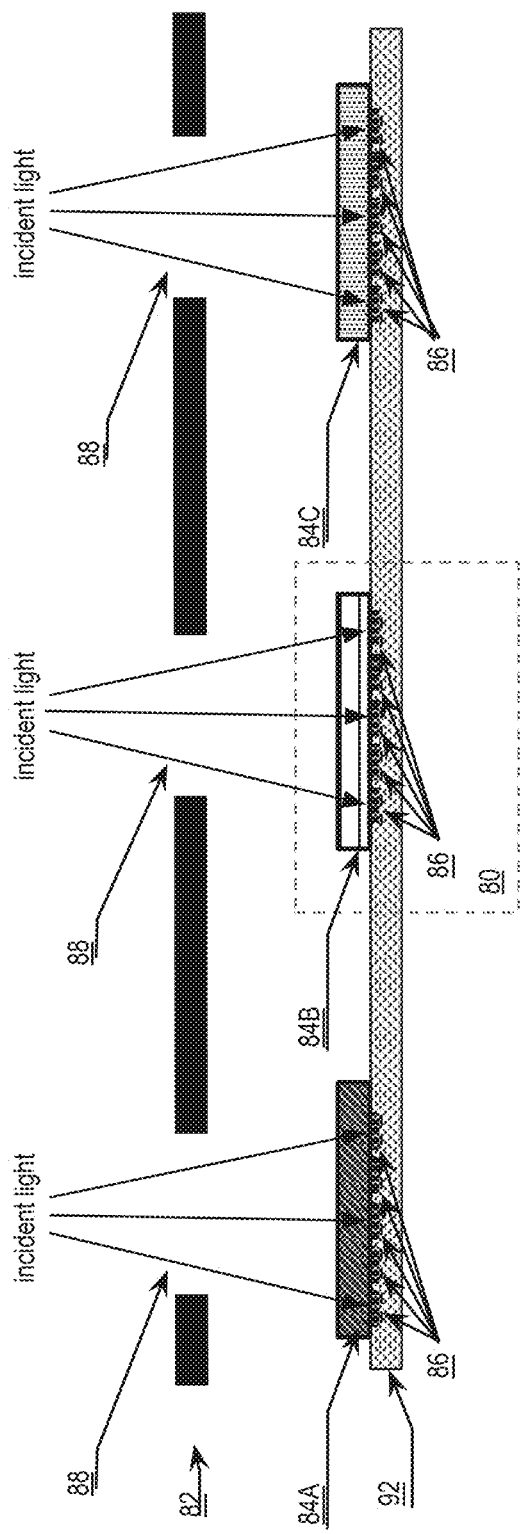

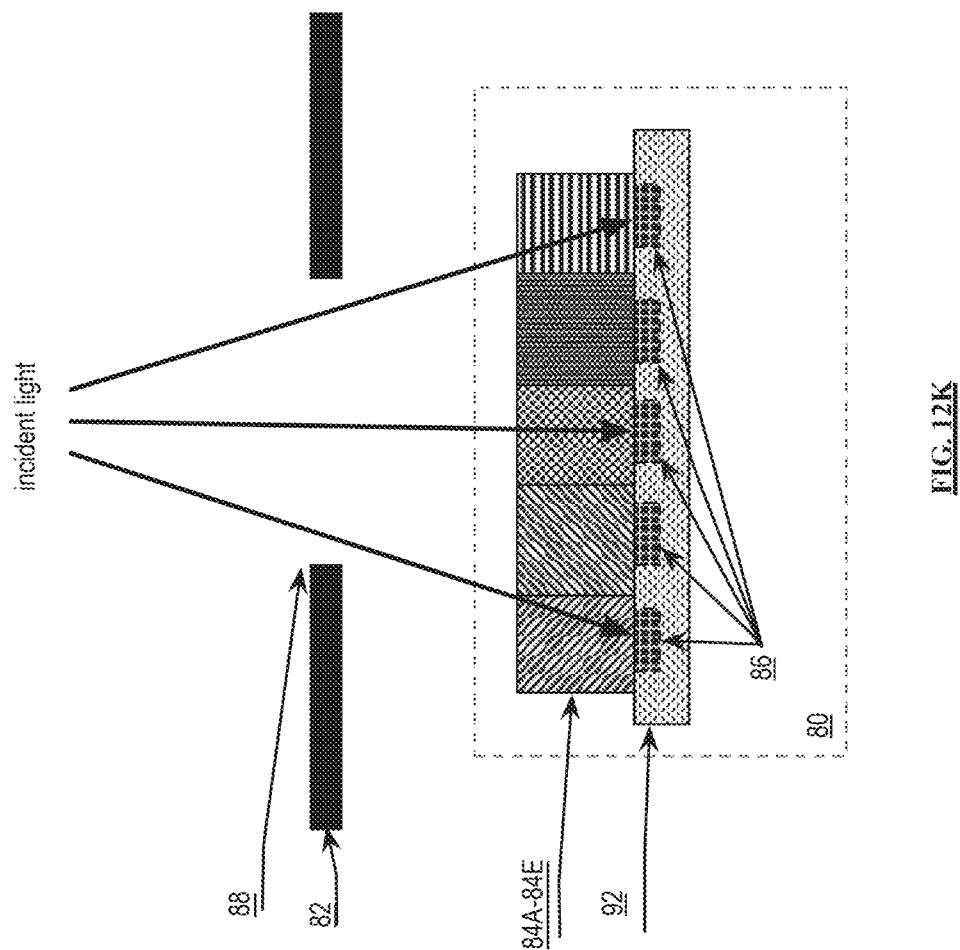

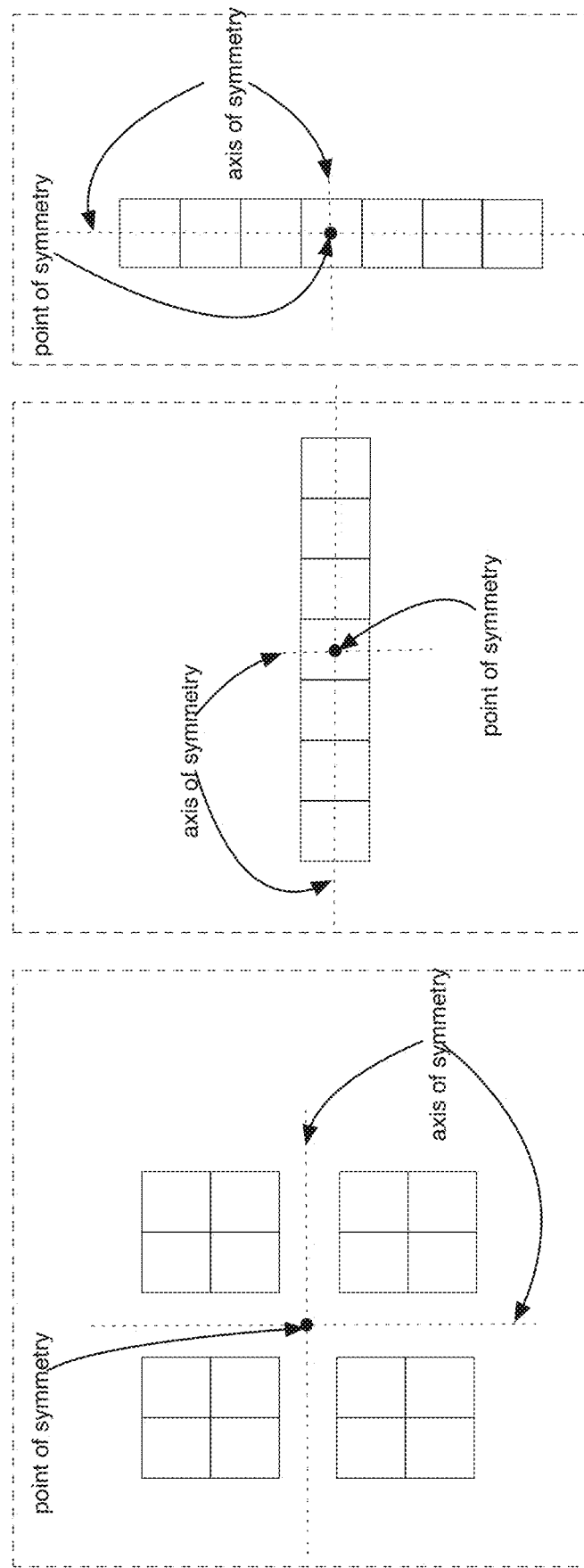

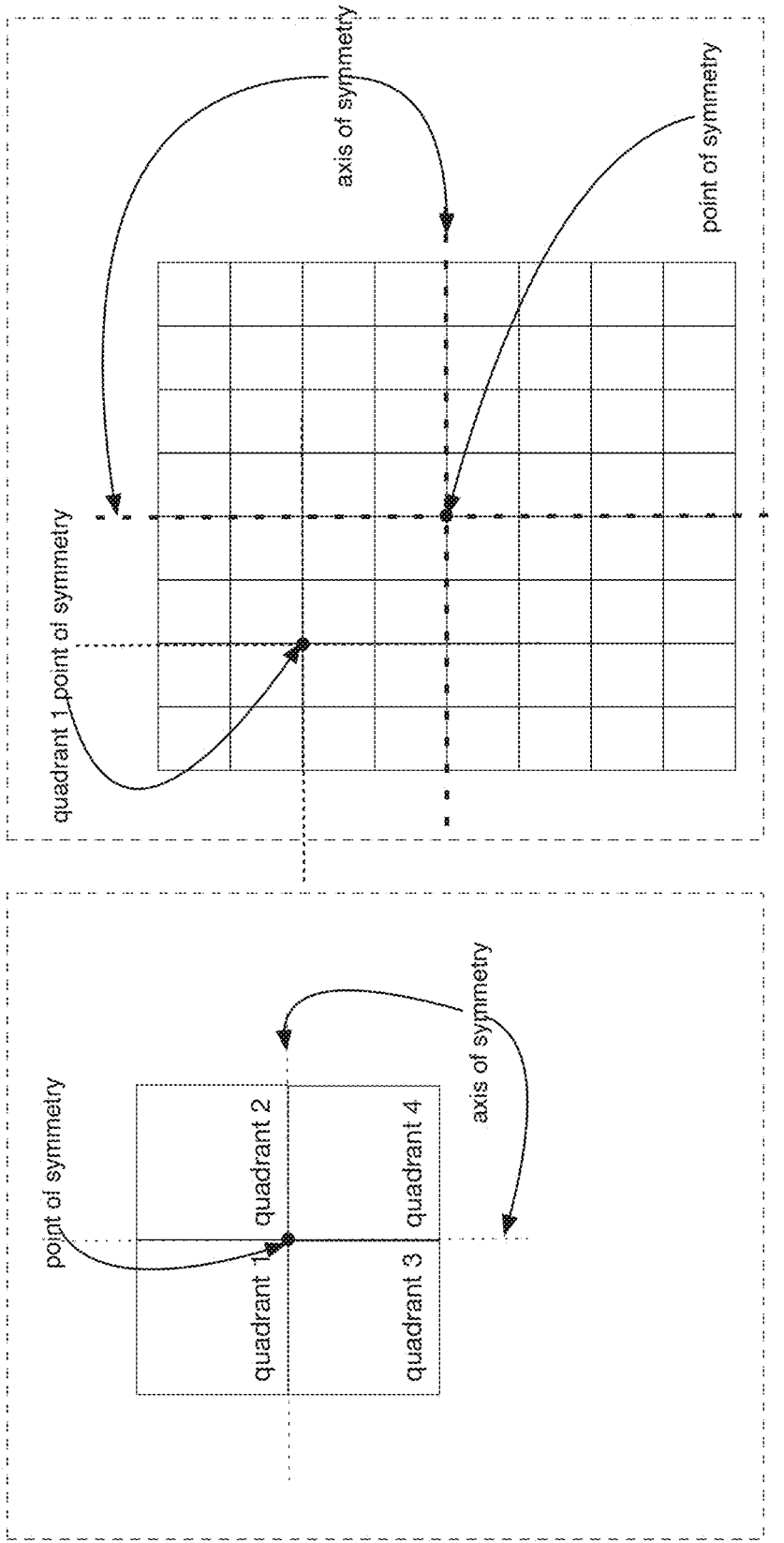

SPECTRAL SENSOR SYSTEM WITH SPATIALLY MODIFIED CENTER WAVELENGTHS

CROSS REFERENCE TO RELATED PATENTS

The present U.S. Utility Patent Application claims priority pursuant to 35 U.S.C. § 121 as a divisional of U.S. Utility application Ser. No. 17/302,465, entitled "SPECTRAL SENSOR SYSTEM WITH SPATIALLY MODIFIED CENTER WAVELENGTHS", filed May 4, 2021, which claims priority pursuant to 35 U. S.C. § 119(e) to the following U.S. Provisional Applications: U.S. Provisional Application No. 63/143,546, entitled "SPECTRAL SENSOR MODULE", filed Jan. 29, 2021; U.S. Provisional Application No. 63/066,507, entitled "WHITE BALANCE COMPENSATION USING A SPECTRAL SENSOR SYSTEM," filed Aug. 17, 2020; U.S. Provisional Application No. 63/047,084, entitled "WHITE BALANCE COMPENSATION USING A SPECTRAL SENSOR SYSTEM," filed Jul. 1, 2020; and U.S. Provisional Application No. 63/031,298, entitled "SPECTRAL SENSOR SYSTEM WITH MODIFIED CENTER WAVELENGTH," filed May 28, 2020, all of which are hereby incorporated herein by reference in their entirety and made part of the present U.S. Utility Patent Application for any and all purposes.

BACKGROUND OF THE INVENTION

Technical Field of the Invention

This invention relates generally to spectroscopy and more particularly to spectral sensors using interference-based filters.

Description of Related Art

Spectroscopy devices have proven to be useful for applications in various industries including, for example, health, biometrics, agriculture, chemistry and fitness. In general, spectroscopy devices function by detecting and/or acquiring incident light relating to multiple ranges of wavelengths and extracting spectral information. Interference-based filters, such as Fabry-Perot filters, when used in conjunction with spectral sensors have been shown to be capable of providing controlled light wavelengths.

As is further known, the angular response of light traveling through interference-based filters is subject to various non-ideal conditions, which can have a negative effect on the performance of a given spectroscopy device.

BRIEF DESCRIPTION OF THE SEVERAL VIEWS OF THE DRAWING(S)

FIG. 1A provides a top-down representation of an example optical sensor overlaid with filters in accordance with the present invention;

FIG. 1B provides a top-down illustration of an example optical sensor overlaid with filters in accordance with the present invention;

Figure 4B:
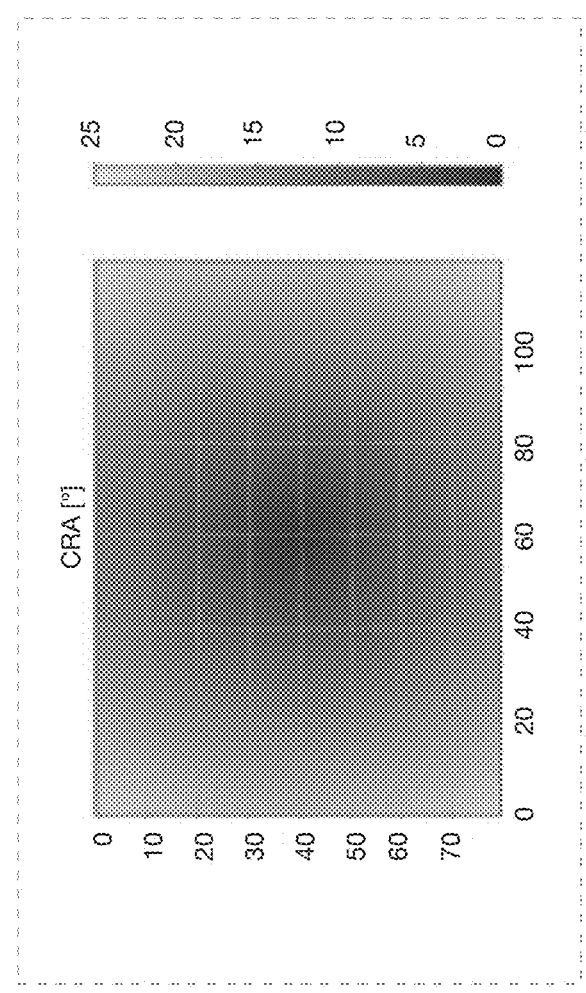
FIG. 4B illustrates an example chief angle ray (CRA) effect for different locations on a sensor with a lens in accordance with the present invention.
Figure 4C:
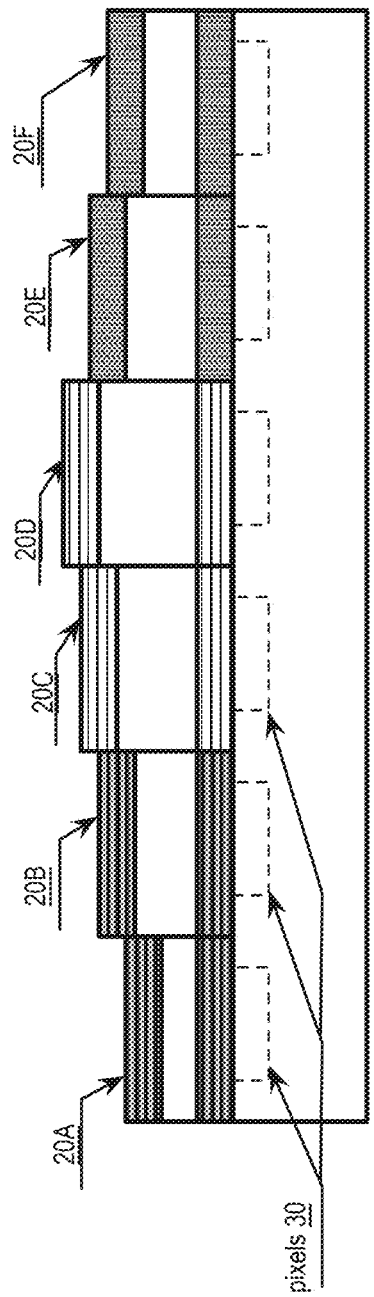
FIG. 4A illustrates the effect of high chief ray angle (CRA) lenses at the outer edges of a sensor array.
Figure 4F:
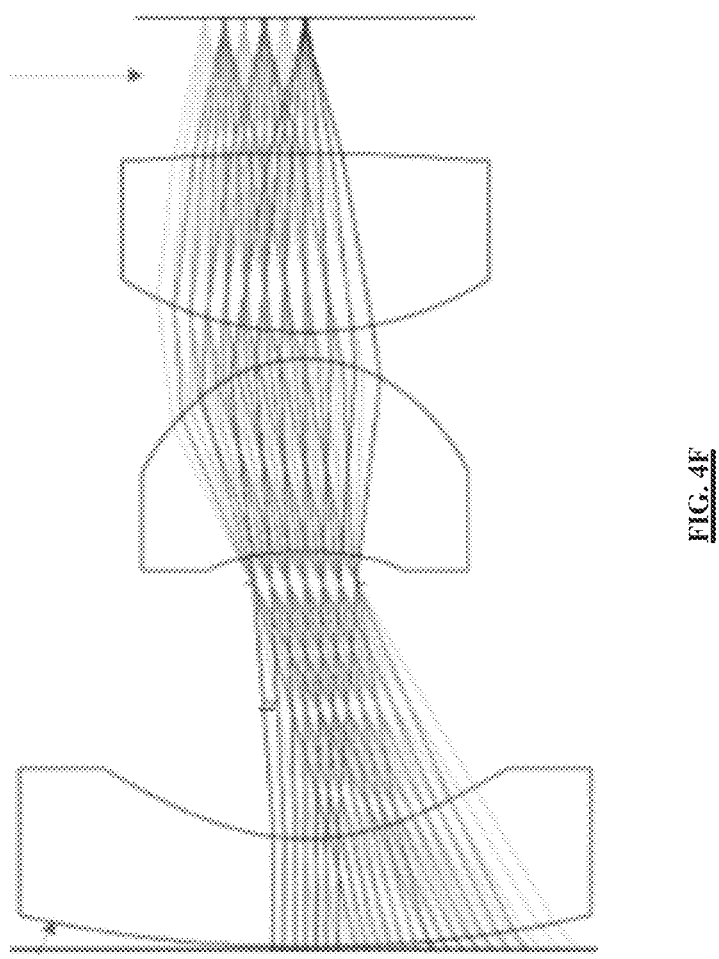
Figure 7A:
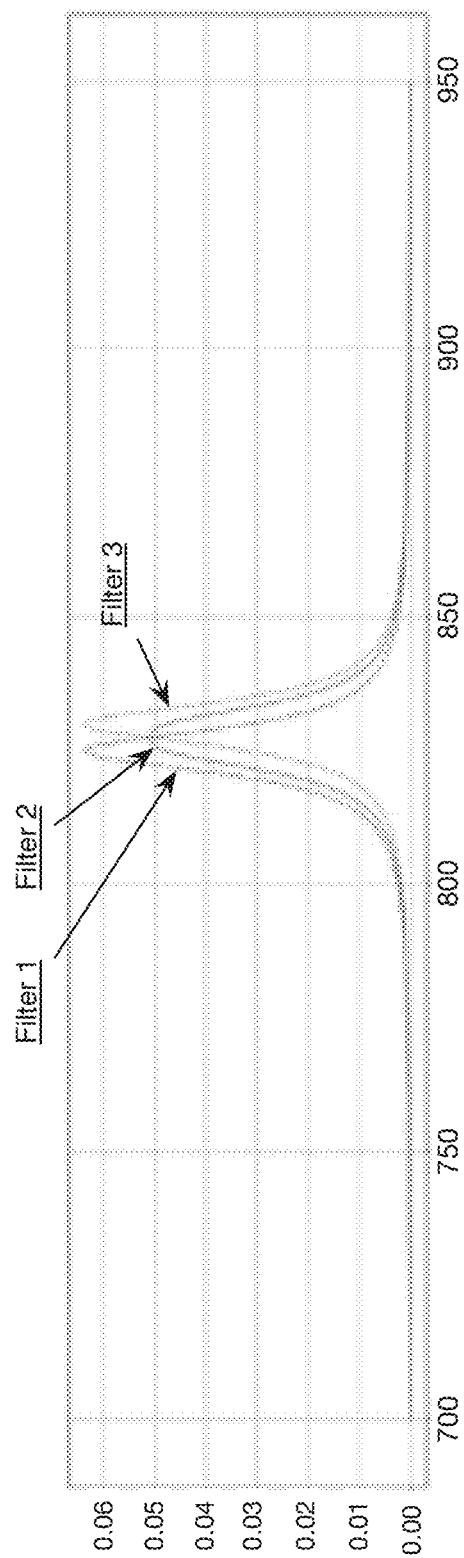
Figure 7B:
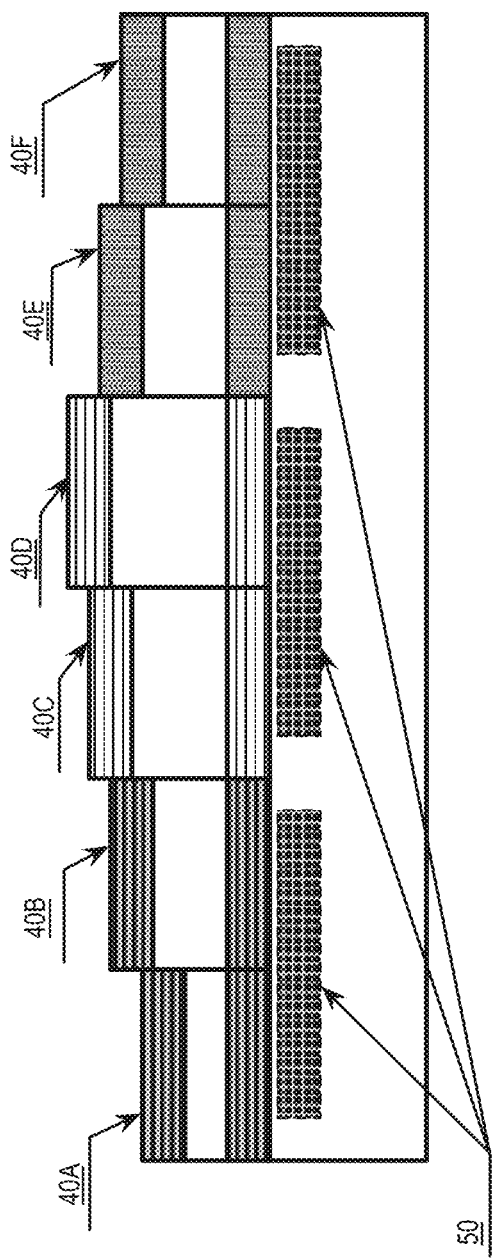

FIG. 4C provides a cross-section of adjacent Fabry-Perot filter stacks (filters) with different cavity thicknesses for an image sensor in accordance with the present invention;

FIG. 4D provides a side-view illustration of an example optical sensor overlaid with a filter array in accordance with the present invention;

FIG. 4E provides a side-view illustration of an example optical sensor overlaid with an alternative filter array in accordance with the present invention;

FIG. 4F illustrates a lens system with a reverse telecentric design in accordance with the present invention;

FIG. 5 illustrates example filter responses for collimated light at 0° and 20° incident angles in accordance with the present invention;

FIG. 6A illustrates an example of a pre-compensated filter array layout with 9×9 mosaics in accordance with the present invention;

FIG. 6B illustrates a shift in filter id resulting from pre-compensation of a filter array in accordance with the present invention;

FIG. 7A illustrates the response from a half-half pixel comprising 2 Fabry-Perot filters with different center wavelengths;

FIG. 7B illustrates a pair of adjacent interference filters associated with a single optical sensor in accordance with the present invention.

FIG. 7C illustrates another example of pairs of adjacent interference filters associated with single optical sensors incorporating an intermediate element between the filters and sensors in accordance with the present invention.

Figure 8C:
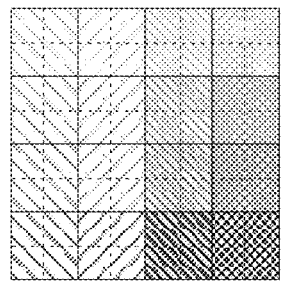
Figure 8B:
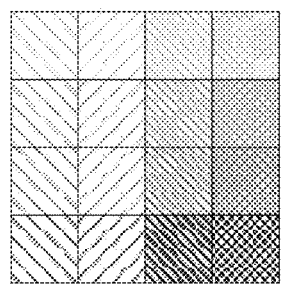
Figure 8A:
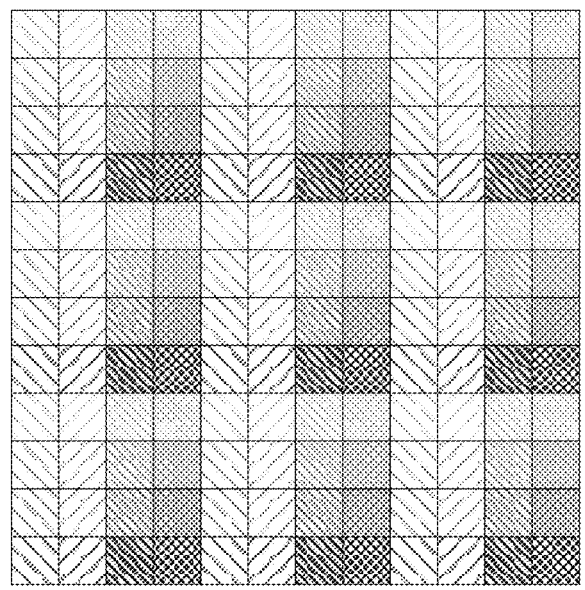
Figure 8D:
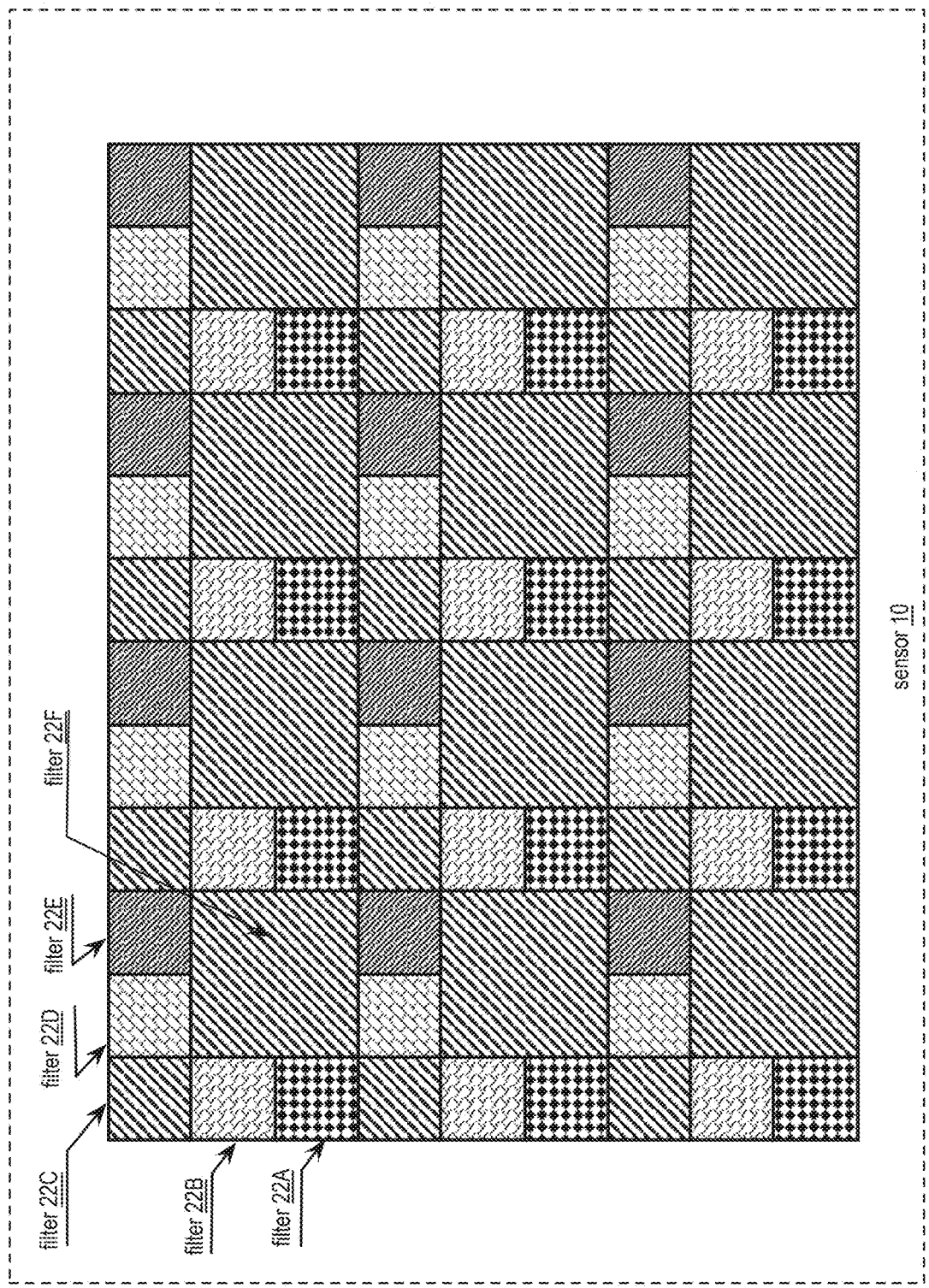

FIGS. 8A-8C illustrate filter patterns for spectral filters for use in spectral image sensors in accordance with the present invention;

FIG. 8D provides a top-down illustration of a filter mosaic pattern for a spectral sensor that includes a large filter element in accordance with the present invention.

Figure 8F:
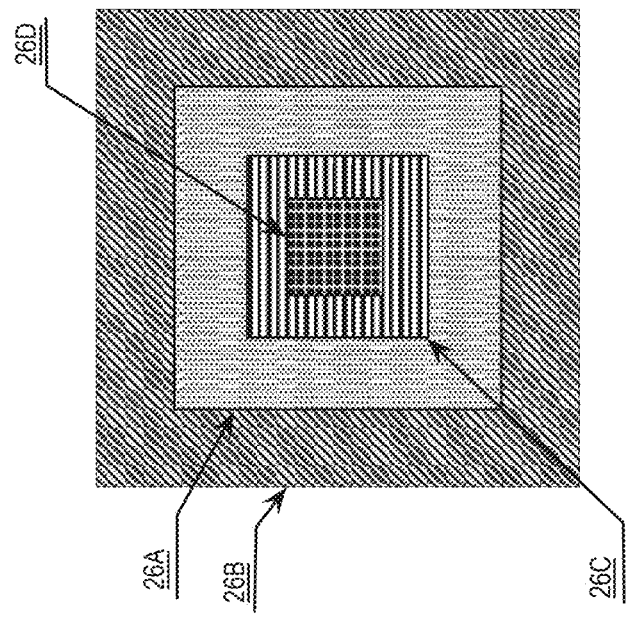
Figure 8E:
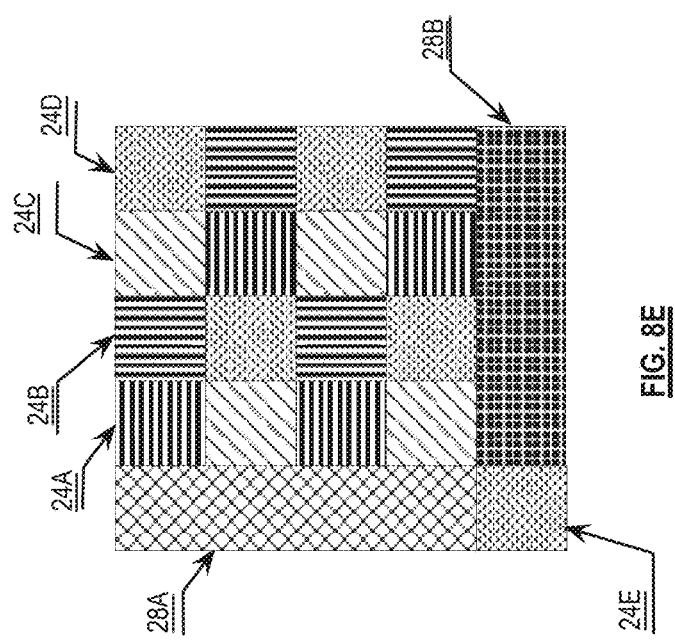
Figure 9:
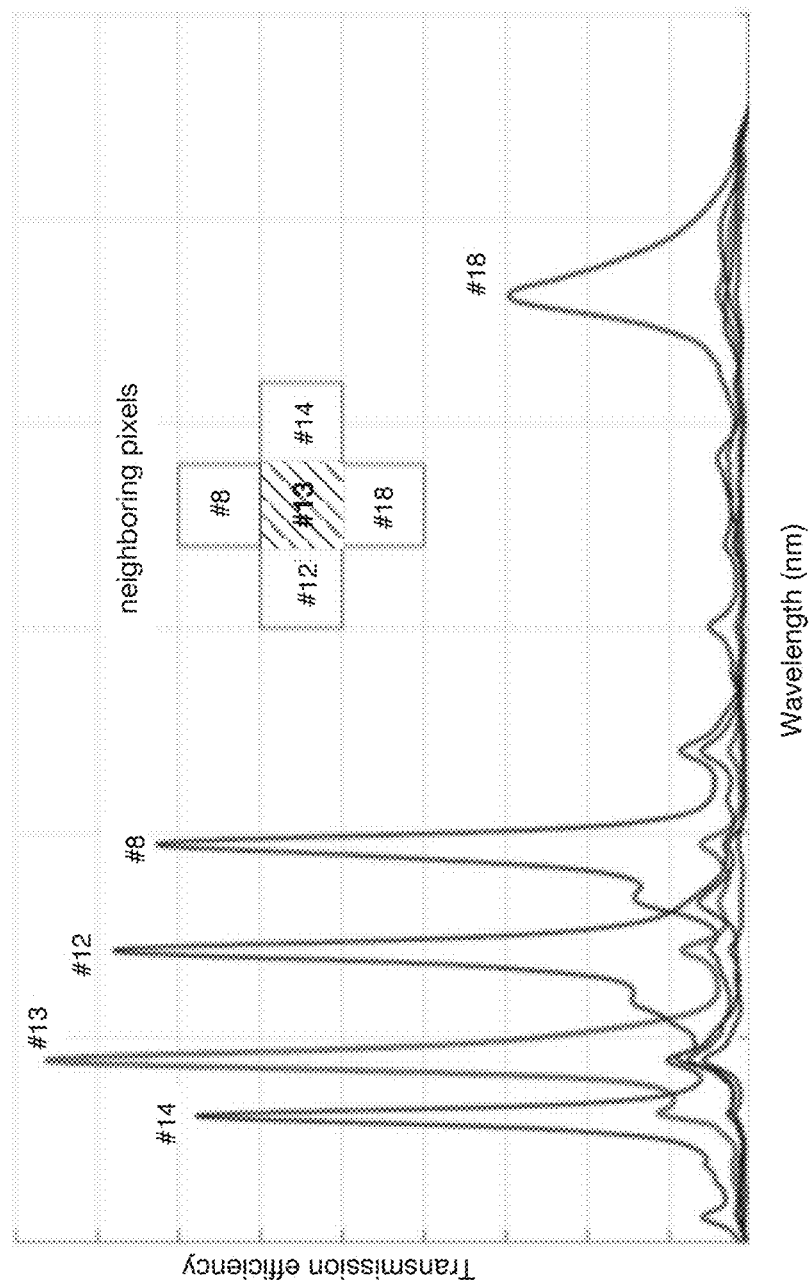
Figure 11A:
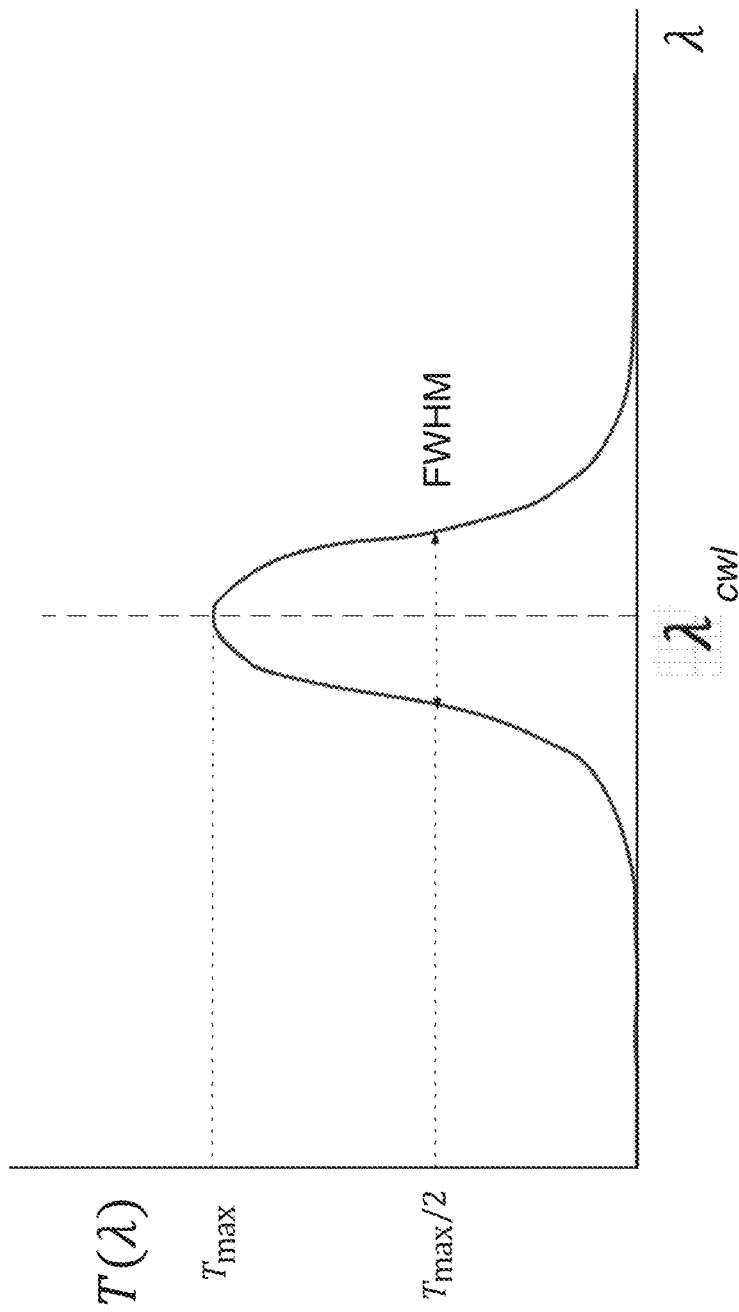
Figure 12C:
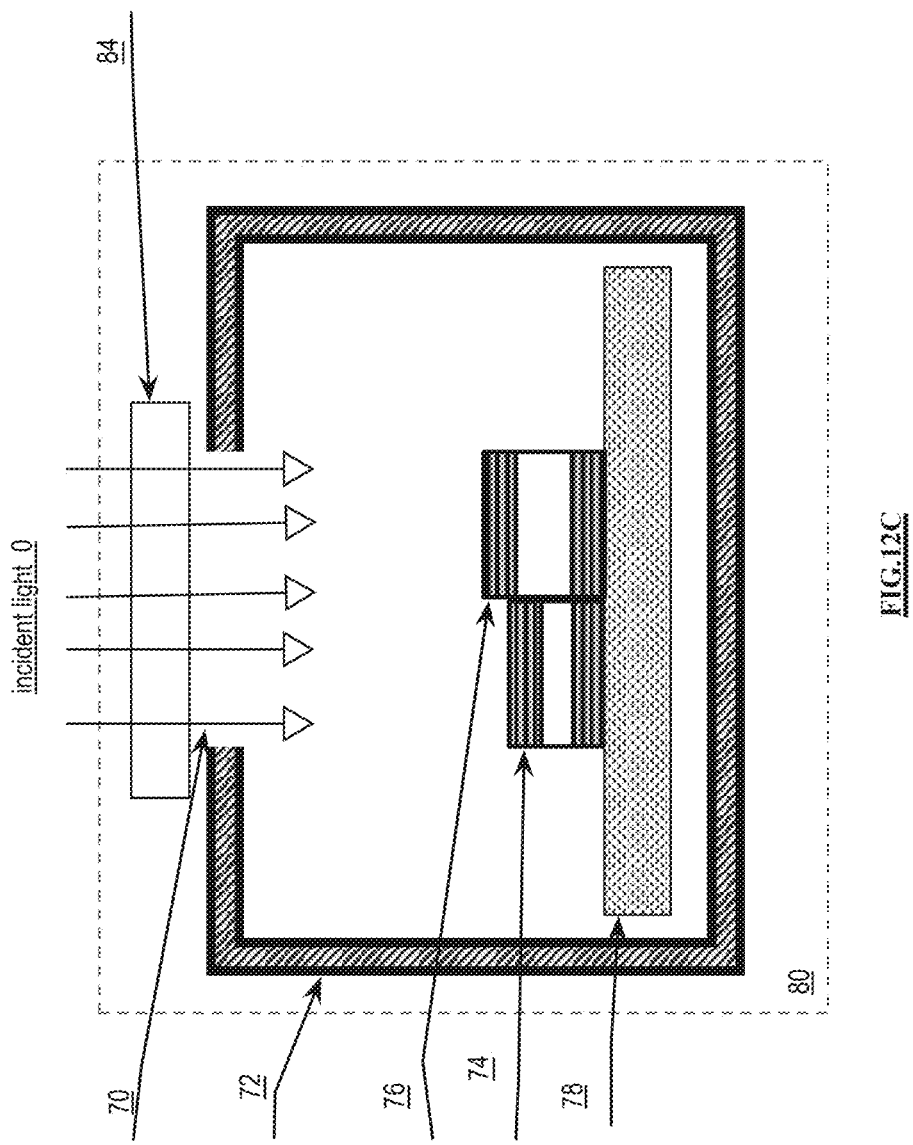
Figure 12E:
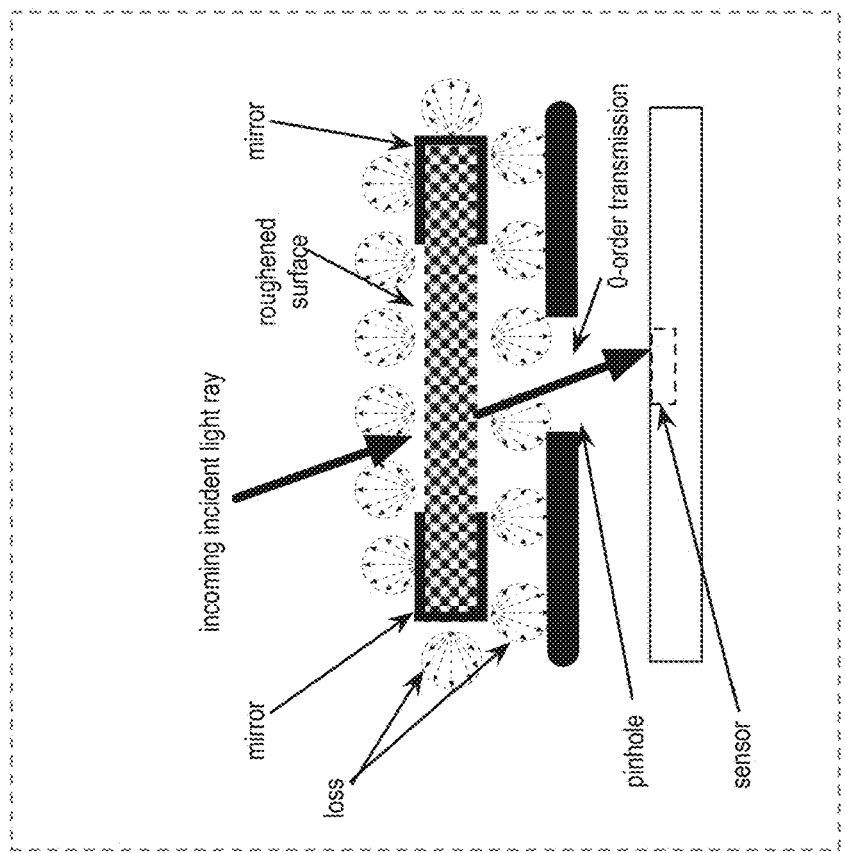
Figure 12D:
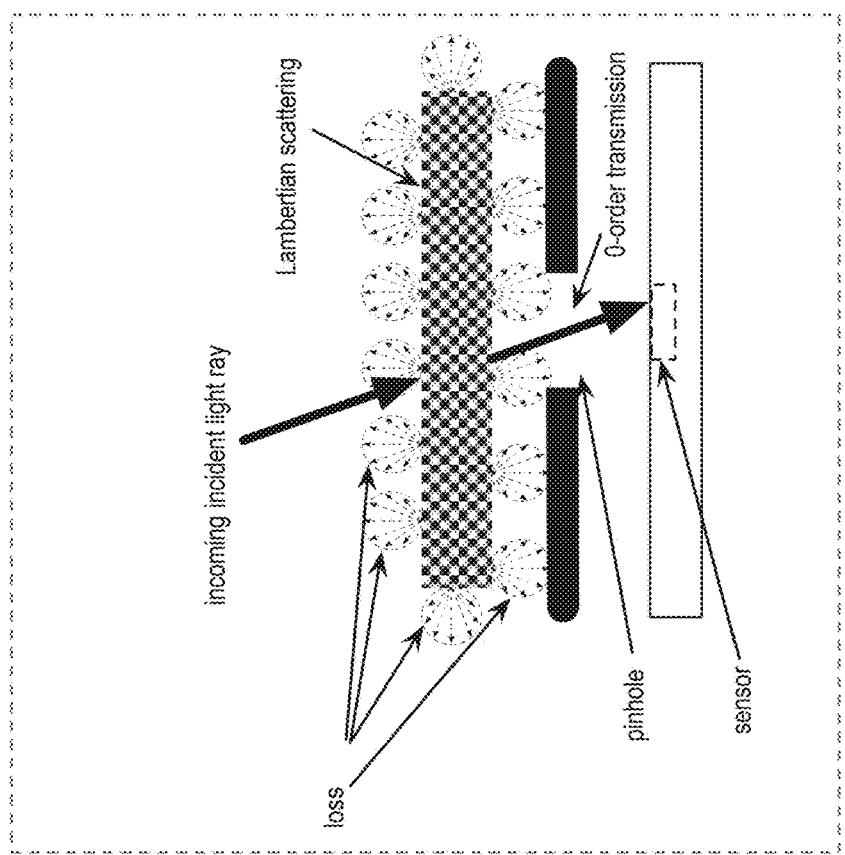
Figure 12G:
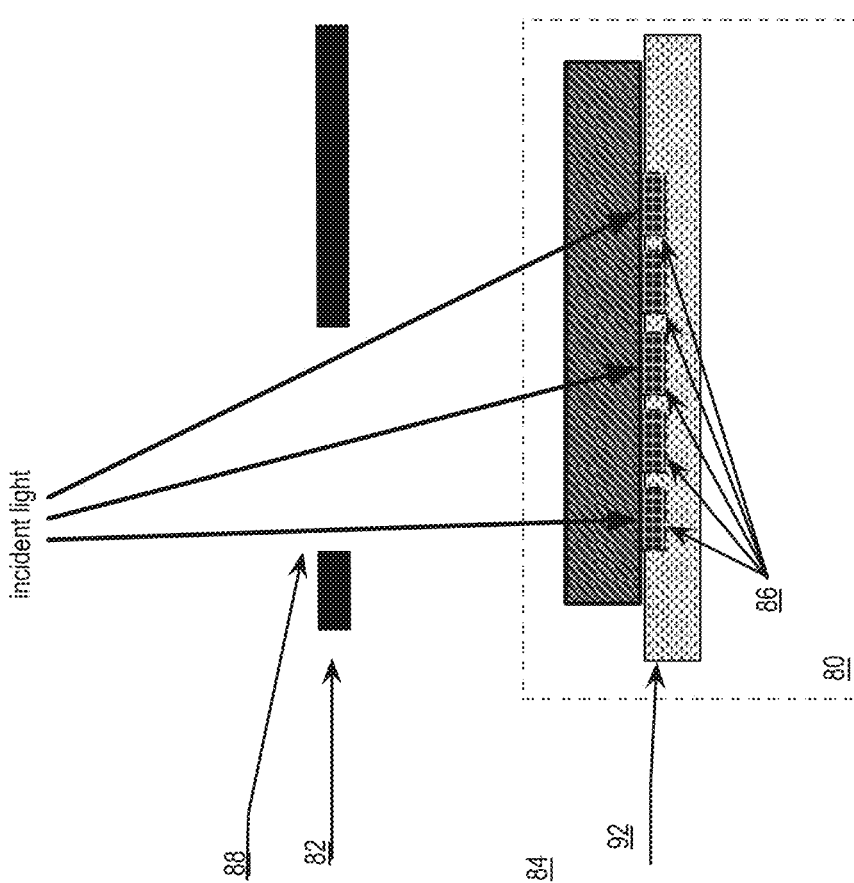
Figure 12H:
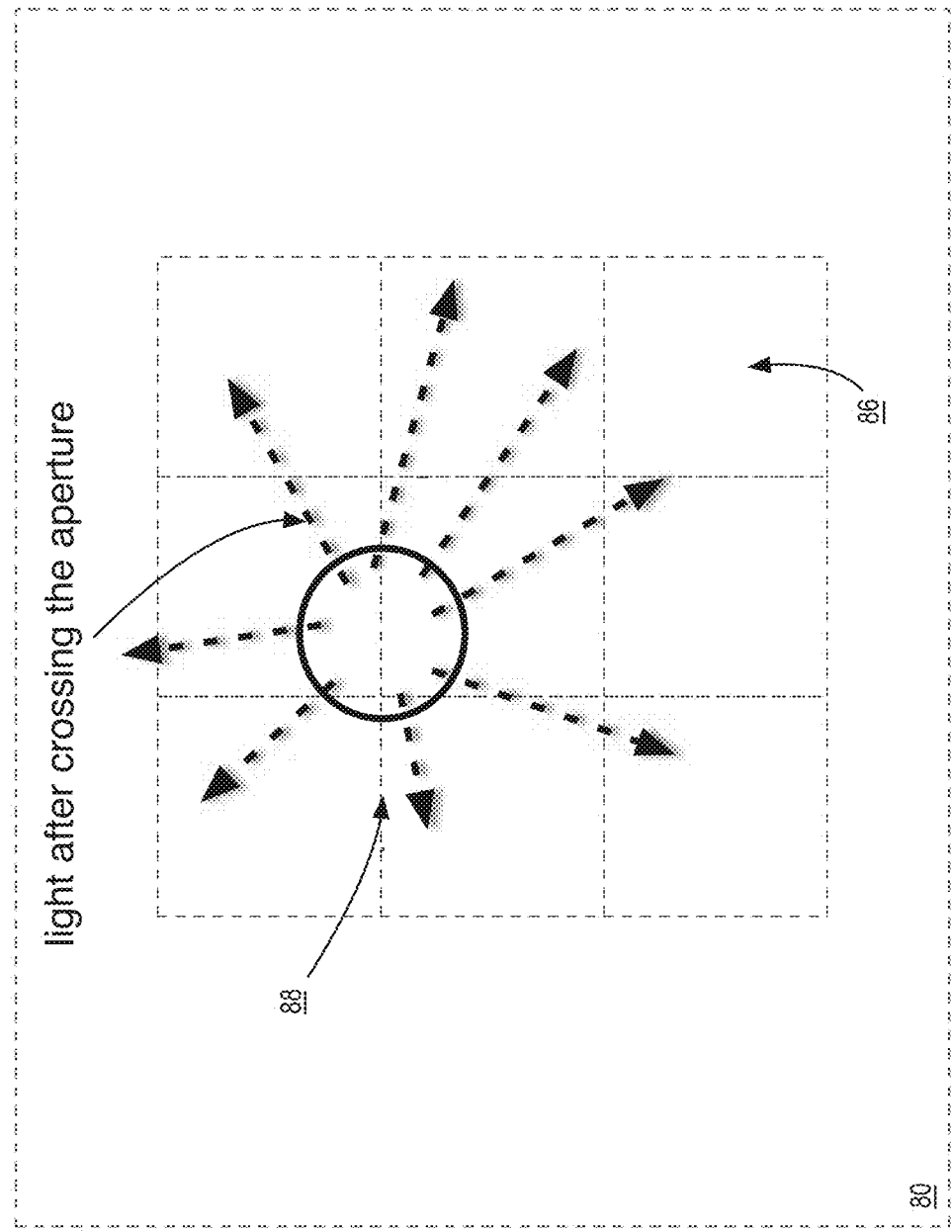
Figure 12J:
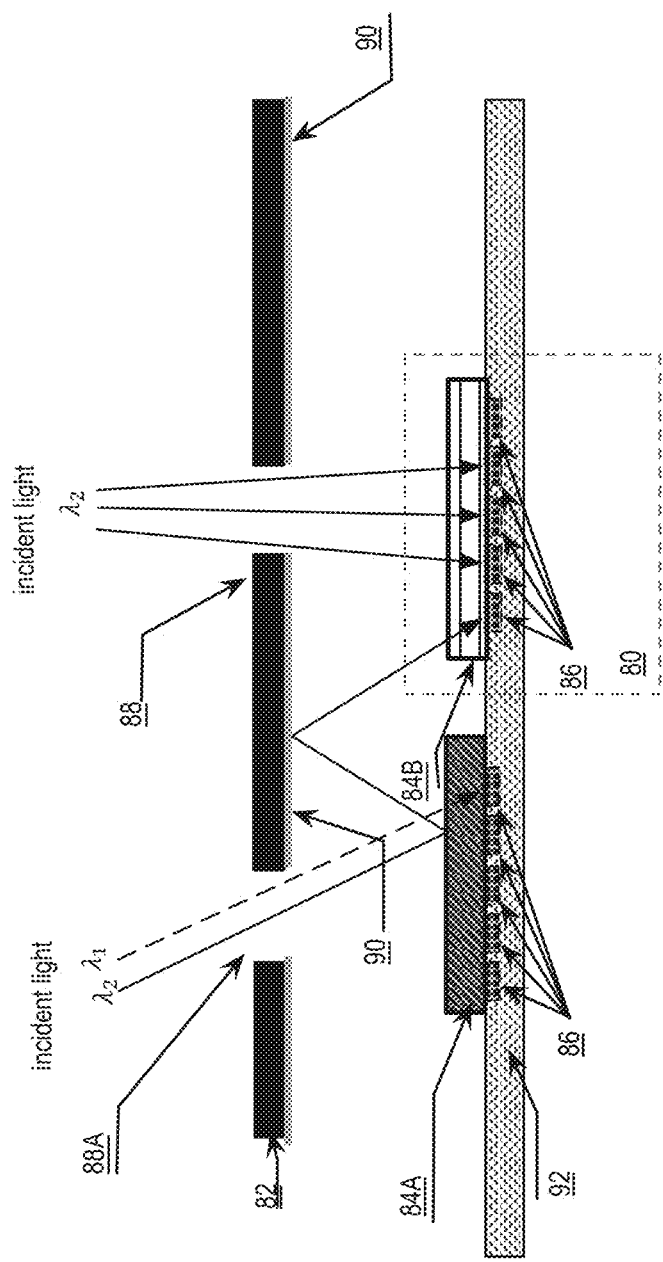
Figure 12L:
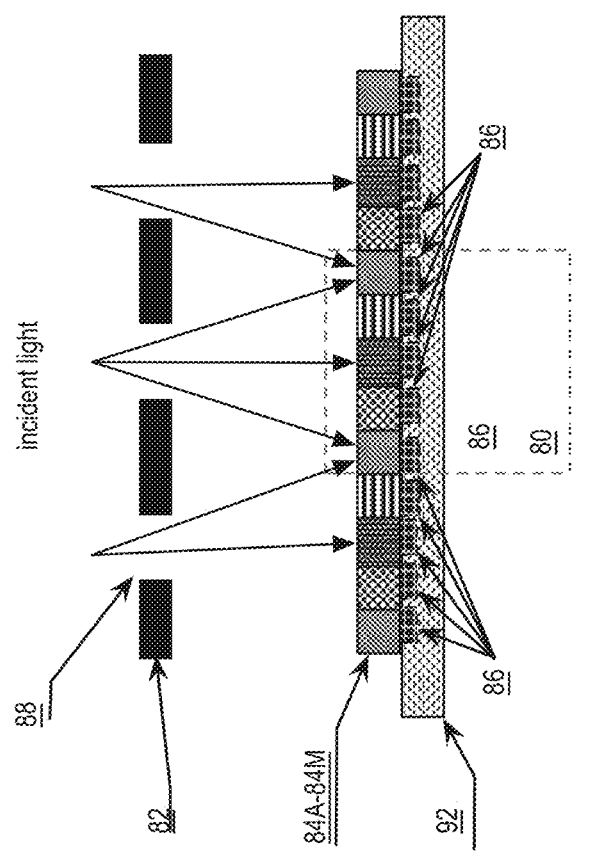
Figure 12N:
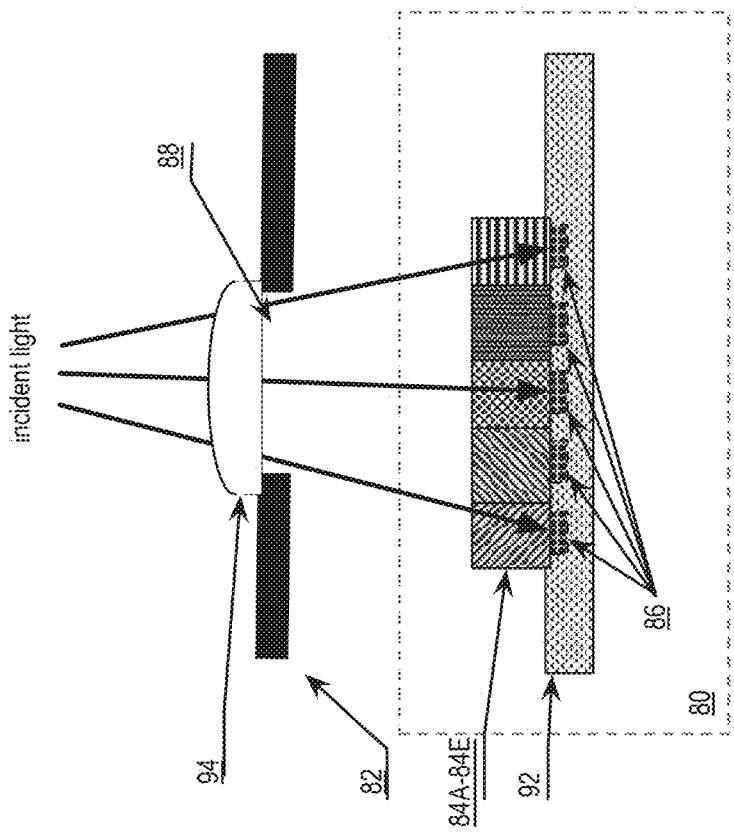
Figure 12M:
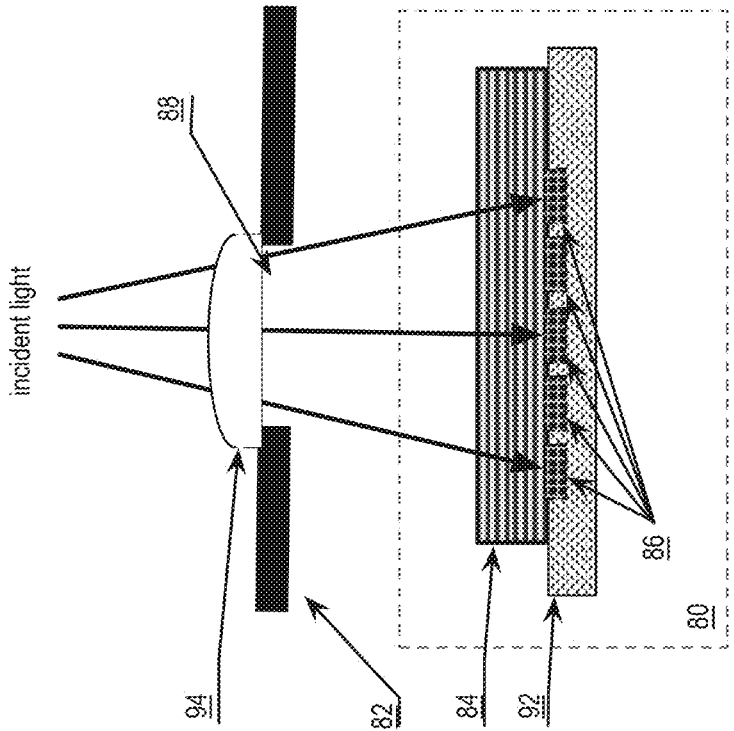
Figure 12O:
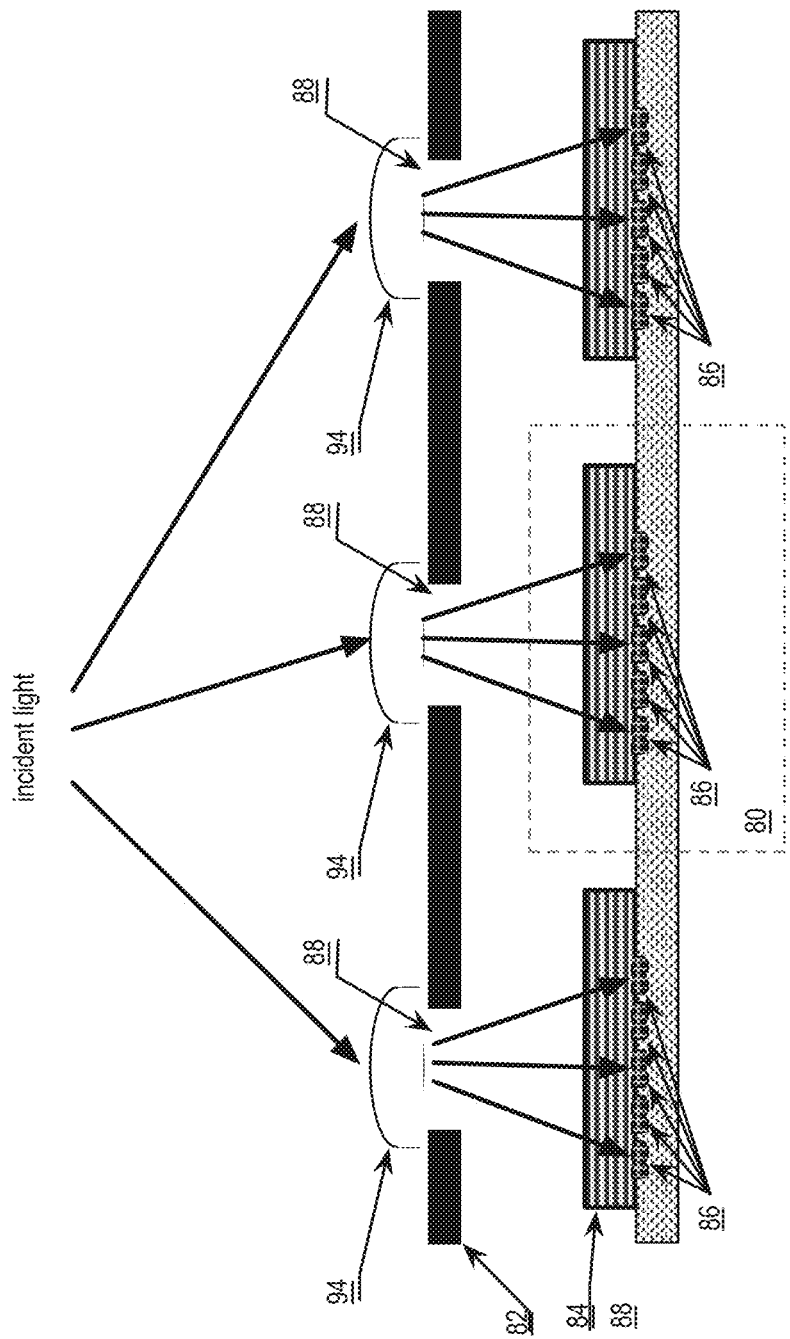
Figure 12P:
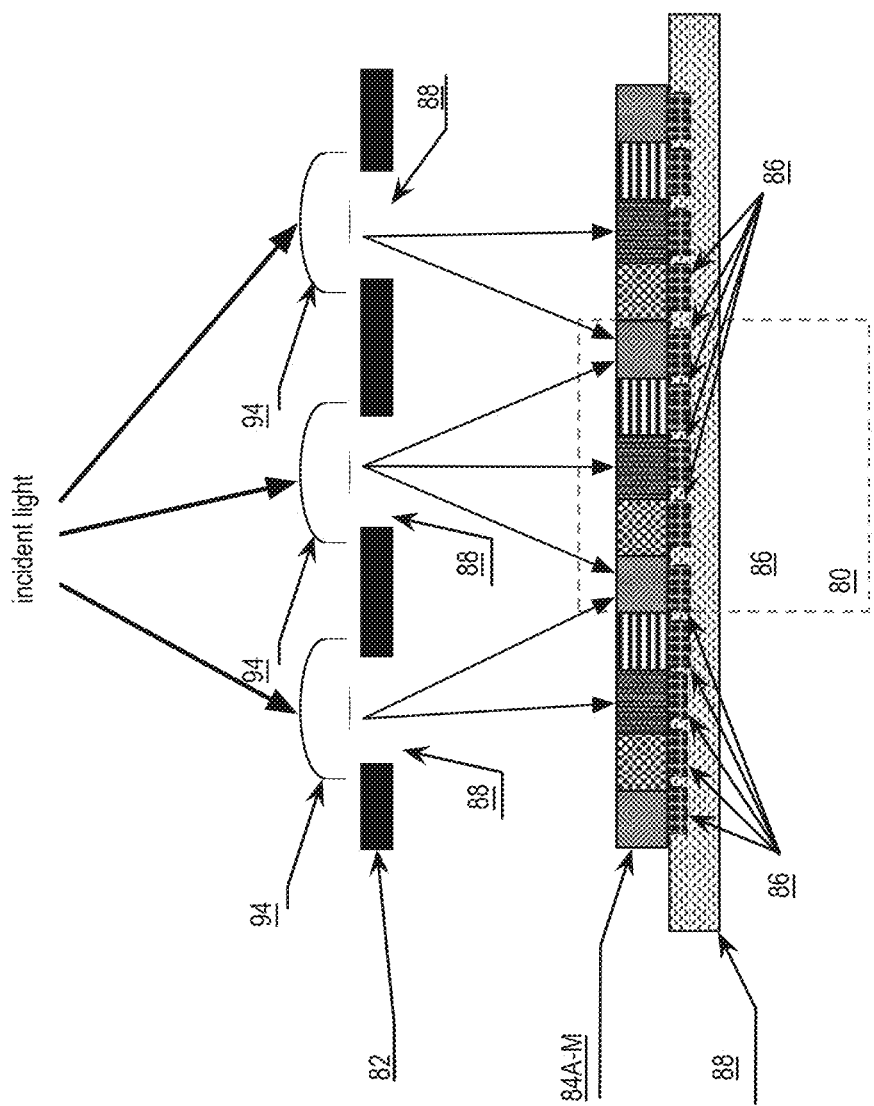
Figure 15:
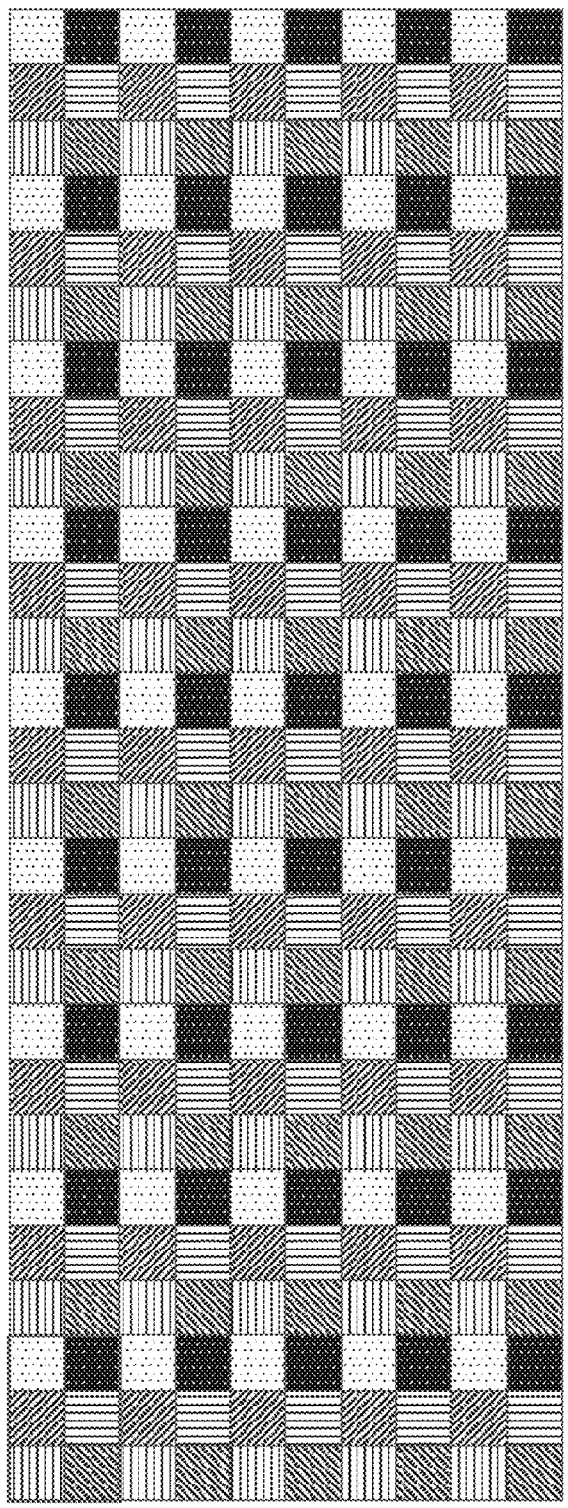

FIG. 8E provides a top-down illustration of another filter mosaic pattern for a spectral sensor that includes filter elements forming larger oblong shapes in accordance with the present invention;

FIG. 8F provides a top-down illustration of an filter mosaic pattern for a spectral sensor with filter elements forming progressively smaller rings around a central filter element in accordance with the present invention;

FIG. 9 illustrates example filter responses for a target or center pixel and adjacent "neighbor" pixels of a spectral image sensor;

FIG. 10 provides a top-down view of an example spectral image sensor utilizing multiple pixels each having a single filter in accordance with the present invention;

FIG. 11A illustrates an example response for an optical filter receiving collimated light at a desired center wavelength (cwl);

FIG. 11B provides a side cross-sectional view of a sensor module in accordance with the present invention;

FIG. 12A provides a side view of an example sensor system using Fabry-Perot filters in accordance with the present invention;

FIG. 12B provides a side view of an example sensor system using Fabry-Perot filters illustrating angular distribution for 2 different light sources in accordance with the present invention;

FIG. 12C provides a side view of an example sensor system with an optical diffuser element in accordance with the present invention;

FIG. 12D illustrates scattering from a diffuser element in a sensor system in accordance with the present invention;

FIG. 12E illustrates a sensor system utilizing a modified diffuser element in accordance with the present invention;

FIG. 12F provides a side-view of a spectrometer system illustrating changes to measured center wavelengths based on the angle of incidence of incoming light in accordance with the present invention;

FIG. 12G provides a side-view of another spectrometer system illustrating changes to measured center wavelengths based on the angle of incidence of incoming light in accordance with the present invention;

FIG. 12H provides a top-down view of an offset aperture with respect to the center of a macro-pixel in accordance with the present invention;

FIG. 12I provides a side-view of a spectrometer system illustrating macro-pixels associated with interference-based filters and apertures in accordance with the present invention;

FIG. 12J provides a side-view of the example spectrometer system of 12I illustrating light propagation with reflective apertures in accordance with the present invention;

FIG. 12K provides a side-view of another spectrometer system illustrating macro-pixels associated with interference-based filters and apertures in accordance with the present invention;

FIG. 12L provides a side-view of another spectrometer system illustrating macro-pixels associated with interference-based filters and apertures in accordance with the present invention;

FIGS. 12M and 12N provide side-views of a spectrometer system illustrating the use of a lens to control the angle of incidence received at a macro-pixel in accordance with the present invention;

FIG. 12O provides a side-view of a spectrometer system illustrating the use micro-lenses to control the angle of incidence received at a macro-pixel in accordance with the present invention;

FIG. 12P provides a side-view of another spectrometer system illustrating the use micro-lenses to control the angle of incidence received at a macro-pixel in accordance with the present invention;

FIG. 13A provides a top-down illustration of an example optical filter layout for shading compensation in accordance with the present invention;

FIG. 13B provides an additional top-down illustration of example optical filter layouts for shading compensation in accordance with the present invention;

FIG. 13C provides an additional top-down illustration of example optical filter layouts for shading compensation, in accordance with the present invention;

FIG. 14A provides a naming convention for 4 quadrants of a common centroid optical filter layout in accordance with the present invention;

FIG. 14B provides an additional top-down illustration of an example optical filter layout for shading compensation in accordance with the present invention; and FIG. 15 provides an additional top-down illustration of an example 2×3 macro pixel mosaic optical filter layout for shading compensation in accordance with the present invention.

DETAILED DESCRIPTION OF THE INVENTION

In various examples, spectral image sensors are combined with interference filters to provide spectral information about a scene and/or light source. In further examples, interference-based filters can be implemented using Fabry-Perot filters integrated with spectral image sensors, such as CMOS sensors, to provide small-scale spectral image sensor systems. In some examples, small-scale spectral imaging systems can be adapted for use in applications that require lenses with relatively high chief ray angle (CRA) for performance and/or cost reasons. Examples of applications utilizing high CRA lenses include, but are not limited to, smart mobile phones, smart watches, body monitors, calibration systems, inspection systems and certain industrial applications. So called "high CRA" lenses allow light to present at the interference filters at oblique angles, which can effectively provide a different CRA at the edge of a sensor array than the lens provides in the center of the sensor array.

Figure 1A:
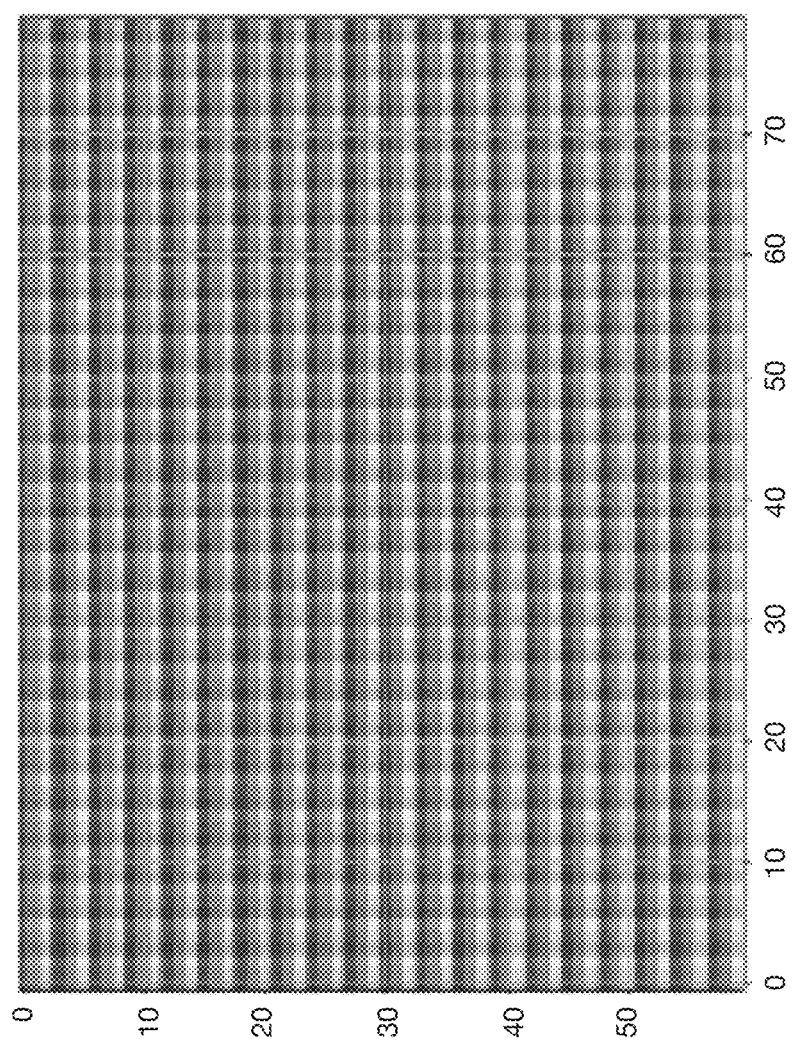

FIG. 1A provides a top-down representation of a spectral sensor with filters provisioned in a 3×3 patterns of 9 bands each across the sensor array. In the example, Fabry-Perot filters with different center wavelengths (expressed as different colors in the representation) are patterned across the spectral sensor as a mosaic structure repeated across the array. In other examples, the 3×3 filter pattern can be replaced with other patterns, such as a 2×2 pattern, a 4×4 filter pattern, a 5×5 filter pattern or a 3×4 pattern, etc., as dictated by resolution and/or manufacturing requirements. In an example, a 3×3 pattern of filters provides 9 different cavity thicknesses, which are then repeated across an example sensor array. In the example of FIG. 1A each of the 9 filter thickness is repeated 540 times across the 20×27 array of sensors.

Figure 1B:
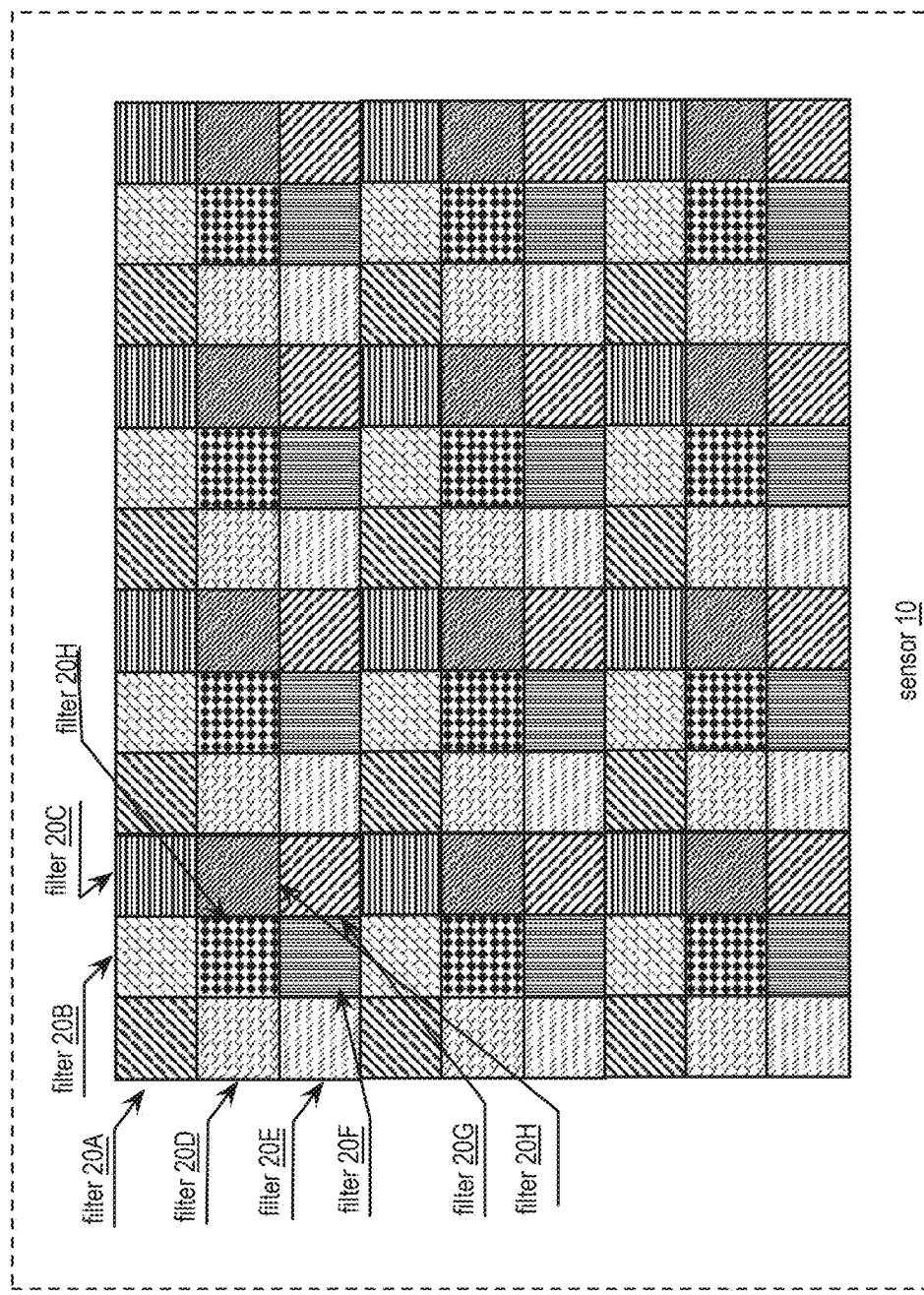

FIG. 1B provides a top-down illustration of an example optical sensor overlaid with filters. In the example of FIG. 1B each of the 9 filter thicknesses (illustrated as filters 20A-20E, etc.) is repeated 12 times across the 12×9 array of optical pixels on sensor 10.

In a sensor system based on FIG. 1B optical pixels for sensor 10 are disposed on an integrated circuit with a plurality of sets of interference filters manufactured on top of the optical pixels. In an example, a set of nine (9) interference filters 20A-20I are arranged in a mosaic pattern, each of which is configured to pass light in a different wavelength range. In an example, each set of interference filters is aligned to at least a set of optical sensors, such that each set of optical sensors is able to sense a localized bandpass response with 9 channels. The set of optical sensors and filter arrangement are then repeated across the array, enabling the optical sensor array to provide multiple measured light spectra spatially separated across different areas of an image sensor. As used herein, an individual optical sensor corresponds to a pixel (pixel=smallest addressable element), where a pixel is a photodiode. Accordingly, "optical sensor", "optical pixel" and "pixel" are used interchangeably.

In a specific example of implementation and operation, filters 20A-20I (filters can repeat using a different pattern or can be represented in a random pattern in order to pass filter responses to sensors underlying the filter array. In an example (not shown) spectral bands exceeding 3 could be used to overlay sensors as desired in almost any practical configuration. In a related example, optical sensor 10 is an example of a spectral sensor useful for diffuse optical spectroscopy, where arrays of spectral filters are associated with optical sensors to provide diffuse spectral sensing.

Diffuse optical spectroscopy can be especially sensitive to the uniformity and stability of the angle-of-incidence of light striking sensors, thus the angle-of-incidence of light striking a sensor array is preferably unmodulated, in a relative sense, when the angle-of-incidence of light striking the surface of spectral filter changes. In an example, when each spectral band of a filter array, such as filters 20A-20I (together constituting a set of spectral bands or spectrum), is spatially distributed on the surface of a sensor array, the spatial distribution can have a significant effect on the performance of a diffuse optical spectrometer. This is at least partially due to the reality that when a particular filter passes light of different intensity, the reconstructed spectrum striking a sensor array will be deformed, or "colored". A colored spectrum can be compensated for (calibrated) electronically, however, if the uniformity of light passing through the filter changes over time, or if it the CRA or angularity of the incident light changes, a reconstructed spectrum will be unstable. In such an example a reconstructed spectrum will appear to have a change in spectral response when on the angle-of-incidence of the incident light striking the optical sensor has changed.

Diffuse optical sensors can benefit from a reduction on the effect on the sensor of a change to the angle-of-incidence of light striking the sensor array and from ensuring that the uniformity of light across the sensor is substantially independent of the angle-of-incidence of light striking the sensor array. Accordingly, in order to provide a stable filter response for an optical sensor, it is preferable to limit the angle-of-incidence of incident light striking the surface of the optical sensor. One method of providing a stable filter response is to ensure that all optical sensors and therefore all optical filters are subject to substantially the same change in angular response, so that the effect on all sensors is uniform. This ensures that the spectrum of diffuse optical spectroscopy is not subject to substantial "recoloring".

In one embodiment, a lens or a lens system can be used to collimate light striking a sensor and/or filter array. Lens systems generally require a relatively large form factor, especially considering the large f-numbers associated with spectral filters (for example f/2 or higher). Lens systems can also be relatively thick and require an expensive optics stack. Lenses and/or lens systems can be likewise sensitive to changes in the angle-of-incidence and CRA of incident light striking the optical sensor through the lens, resulting in a non-uniform change of angularity across the sensor array. These non-uniform changes of angularity can affect different sensors and their spectral response differently. Additionally, since a lens or lens system will necessarily focus the incident light on different parts of a "scene" the attributes of the different parts of the scene will be projected onto different parts of a sensor array, resulting in a non-diffuse spectral response.

Fabry-Perot filters are sensitive to input angle. This results into a blue shift (where a blue shift is a shift towards shorter wavelengths) to the filter response when light with an increased chief ray angle (CRA) passes through the filter. In the first order, this center wavelength (cwl) shift can be approximated as:

$$\Delta \lambda_{cwl} \approx \lambda_{cwl}\left(1 - \cos\frac{\theta_{CRA}}{n_{\text{eff}}}\right) \quad (1)$$

where $\lambda_{cwl}$ is the center wavelength of the Fabry-Perot filter under collimated orthogonal light, $\theta_{CRA}$ is the incident angle of the collimated light, and $n_{\text{eff}}$ is the effective refractive index of the Fabry-Perot cavity.

Figure 2:
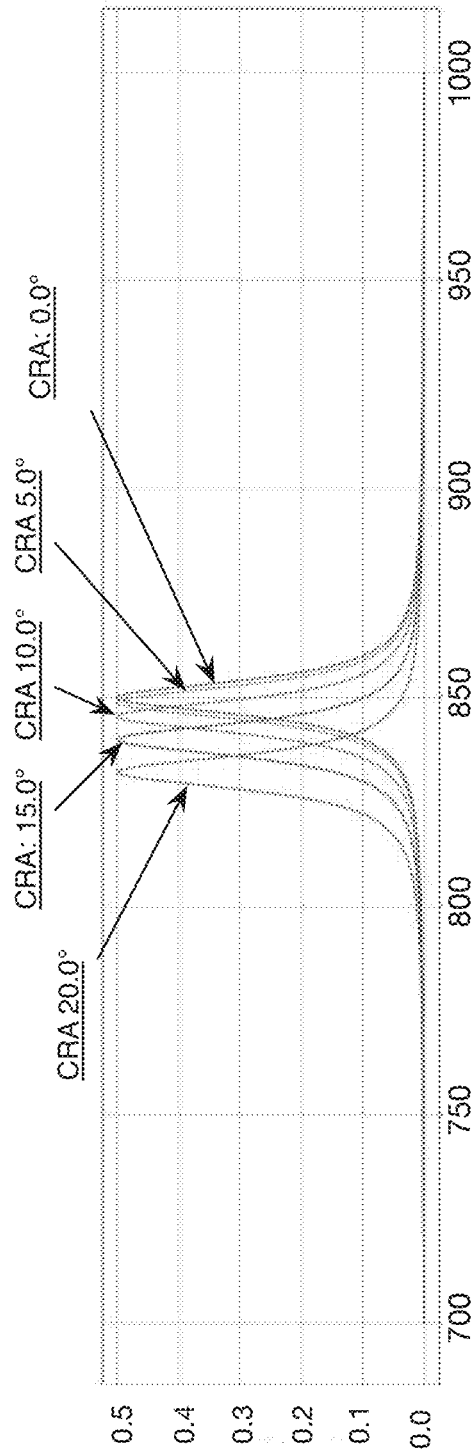
FIG. 2 illustrates an example filter response to light of different incident angles at a given center wavelength.

FIG. 2 illustrates an example filter response to light of different incident angles at a center wavelength $\lambda_{cwl}$.

Figure 3:
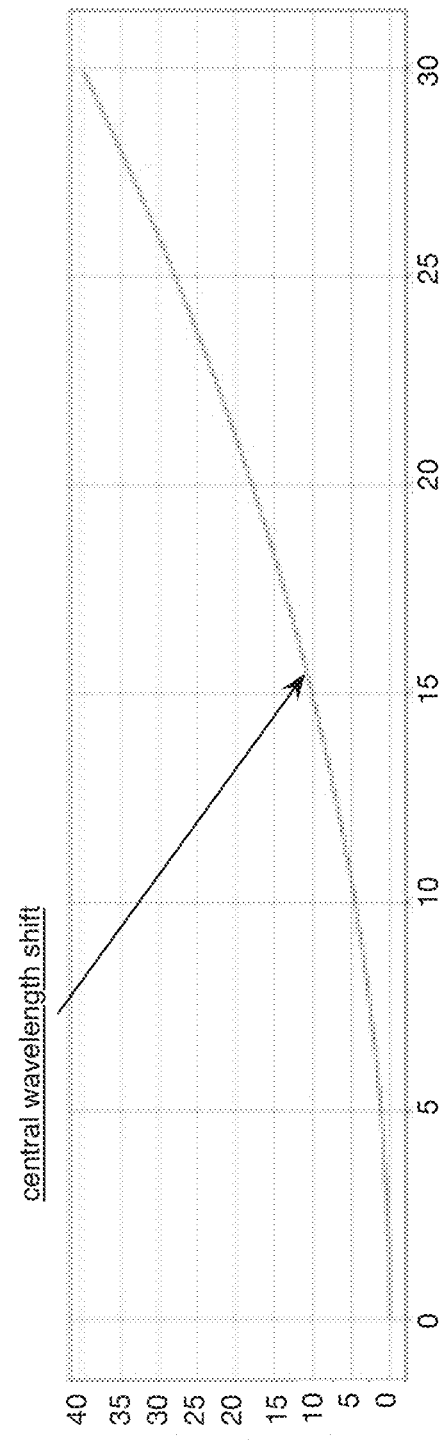
FIG. 3 illustrates an example shift in center wavelength (cwl) as a function of the incident angle of light passing through a lens.

FIG. 3 illustrates an example shift in center wavelength (cwl) as a function of the incident angle of light passing through a lens (i.e. the CRA alongside the sensor). As discussed above, example spectral image sensor systems designed for cost and/or performance use cases, such as mobile phones and smart watches, can use lenses with a high CRA. As such, the CRA for pixels at the outer edge of the spectral sensor is larger than the CRA at the center of the sensor. Therefore, the cwl for the pixels at the outer edge of the sensor array shifts with respect to the cwl for the pixels at the center of the sensor array. In an example, this results in a CRA shift of more than 20 degrees on the outer edges of the sensor, on top of a typical f-number of—for example—f/2. This 20-degree CRA will result in a blue shift to the filter response of filters on the outer edges of the image sensor array. Accordingly, if all the relative filters in a given filter pattern are substantially identical, pixels at the outer edges of the sensor will reveal a filter response of a filter with different center wavelength than the pixels from filter response for the same filter at the center of the image sensor. Similar effects can be evident when pinhole optics are used.

FIG. 4A illustrates a comparison between the incident angle of light at the outer edges of a sensor array in high and low CRA sensor systems. In the example, a lens 14 is illustrated parallel to light sensitive elements 28 embodied in a substrate 26, with a space separating the light sensitive elements 28 and lens 14. In an example of a low CRA lens/lens system, the angle of incidence of light striking the sensor is limited by the physical relationship between the distance separating the lens from the sensor in combination with CRA of the lens. As illustrated, a low CRA lens results in limited angle of incidence for light passing through the lens, whereas a high CRA lens allows light at more oblique angles to project onto the sensor. In the example, the light arriving at optical filters 22 at the edge of the sensor have a longer path through the filter(s). High CRA lens are sometimes described as exhibiting "non-telecentric" optics. In a lens system exhibiting telecentric optical characteristics the CRA light rays (oblique rays that pass through the center of the lens) are parallel to the optical axis in front of or behind the system, respectively. In a non-telecentric optical system high CRA optics pass light entering the lens at oblique angles to project to the edges of a sensor array.

FIG. 4B illustrates an example chief angle ray (CRA) effect for different locations on a sensor with a lens, such as the spectral image sensor system illustrated in FIG. 4A. In this example, the effective CRA "changes" over the limits of the array due to the lens passing light at increasingly oblique angles, such that a given filter response provides a shift in response for the same light wavelength. A similar effect can be evident for a center wavelength (cwl) of the CRA across the limits of the array due to the blue shift resulting from higher CRA at the edges of the sensor.

Spectral image analysis techniques based on a spectral image sensor include the use of algorithms (e.g. chemo metrical models) that depend on filter response for light passing through a filter, such as a Fabry-Perot filter. As illustrated above, with reference to FIGS. 4A and 4B, a given spectral image sensor can exhibit deviations in wavelengths from the spectrum of light being received at the lens and therefore at the filter, depending on where the spectral image sensor is located on a sensor array. As a consequence of these deviations, the spectral algorithms that rely on image sensor data can/will have reduced accuracy depending on the location of a particular spectral image sensor in the sensor array. In general, different filters designed for use at a given center wavelength will exhibit a shifting chief ray angle (CRA) as light approaches the edge of a sensor array, resulting in lower accuracy spectral response for the spectral image sensor system.

FIG. 4C provides a cross-section of adjacent Fabry-Perot filter stacks (filters) with different cavity thicknesses for an image sensor, such as, for example, sensor 10 of FIG. 1B. As illustrated, the center wavelength of each Fabry-Perot filter is determined in first order by the cavity thickness between its upper and lower mirror. In this example, adjacent filters 20A-20F provide 6 channels of sensor output for pixels 30.

FIG. 4D provides a side-view illustration of an example optical sensor overlaid with a filter array. In the example, received light 180 is directed at sensor array 170 through an unmodified filter array 160. As discussed with reference to FIGS. 4A through 4C, light of the same chief ray angle (CRA) transmitted through filters of unmodified filter array 160 will exhibit a shifting chief ray angle (CRA) as light approaches the edge of the optical sensor. Accordingly, depending on the location of a pinhole or the effect of lens system controlling the angle-of-incidence of light the unmodified filter array 160 will exhibit a shifting response for the same wavelength, as discussed above with reference to FIG. 4B.

In specific example of implementation and operation, a sensor system, includes an array of optical sensors arranged on an integrated circuit, the array of optical sensors having a respective top surface and a plurality of optical filters arranged in an array having a respective bottom surface and a respective top surface, the optical filter array having a respective center portion and a respective outside portion. In an example, the bottom surface of the optical filter array is located proximal to the top surface of the array of optical sensors and each optical filter of the optical filter array is configured to pass a target wavelength range of light to one or more optical sensors of the array of optical sensors. In an example, one or more optical filters in the center portion of the optical filter array are configured to provide a first target wavelength range of light and one or more sets of optical filters in the outside portion of the array are configured to provide a second target wavelength range of light. In the example, an optical element having a respective top surface and a respective bottom surface is included in the sensor system, with the bottom surface of the optical element positioned atop the top surface of the optical filter array.

In an example, the optical element is configured to limit an angle-of-incidence of light passing therethrough and in a related example, the sensor system of claim 2, wherein the optical element is an aperture device, such as a pinhole or aperture lens. In another example, the sensor the plurality of optical filters are configured in a plurality of sets of optical filters, where each set of optical filters includes a plurality of optical filters arranged in a pattern and in a related example, at least some optical filters of a set of optical filters in a set of optical filters are configured to pass light in a different wavelength range.

In another example of implementation, each of one or more sets of optical filters in the center portion of the optical filter array are arranged in a first pattern and each of one or more sets of optical filters in the outside portion of the array are arranged in a second pattern. In an embodiment, the sensor system is adapted for imaging a scene, where each set of interference filters of the plurality of interference filters is associated with a spatial area of the scene. In a related example, the optical filters are selected from a group consisting of interference filters, absorption filters, plasmonic filters and quantum dot filters and in another example, the interference filters include Fabry-Perot filters. In a related example, the sensor system includes at least one optical sensor of the array of optical sensors associated with a plurality of optical filters and in an alternative example, at least one optical sensor of the array of optical sensors is associated with a set of optical filters.

FIG. 4E provides a side-view illustration of an example optical sensor overlaid with an alternative filter array. In an example of implementation and operation, a filter array can be designed to compensate or correct for the shifting CRA of a high CRA lens by modifying the filter array. In the example, received light 180 is directed at sensor array 170 through a modified filter array 162. In an example of implementation, a mosaic pattern of interference filters, such as Fabry-Perot filters manufactured on an image sensor to compensate for the blue-shift due to higher CRA on the outer edges. In the example, the filter array can be implemented with a pre-compensated center wavelength. For a Fabry-Perot filter this can be achieved by using a filter with a thicker cavity. In a specific example of implementation, a filter present at the edge of the sensor may be used with a cavity thickness with, for example, a few nm greater thickness. By way of a specific example, for a filter with a desired 850 nm center wavelength, a filter with increased cavity thickness may, for collimated input light, have a larger center wavelength, such as 868 nm. In the example, for the higher CRA of 20 degrees at the edge of a sensor (due to the higher CRA) lens properties), the center wavelength will shift to 850 nm in a gradated fashion.

FIG. 4F illustrates a lens system with a reverse telecentric design. In an example of implementation and operation, a reverse telecentric lens system can provide a large field of view and a low chief ray angle (CRA), such that by adjusting the elements of the telecentric design an image can be blurred for various implementations, such as, for example, correction of average white balance (AWB), while being adjustable to focus the image for high-spatial resolution image capture. Telecentric lenses are known to provide an orthographic projection, providing the same magnification at all distances. In an example, an object that is too close may still be out of focus, but the resulting blurry image can have the substantially the same size as the correctly focused image would. In a reverse telecentric lens system one or more elements of a telecentric lens system are reversed, resulting in a more uniform color distribution to the spectral filters.

FIG. 5 illustrates example filter (such as a Fabry-Perot filter) responses for collimated light at 0° and 20° incident angles. In an example of implementation, a constant filter center wavelength is desired. In an example Fabry-Perot filter manufacturing processes, $2^N$ filter cavity thicknesses may be manufactured with N process steps. In a specific example of implementation, in a Fabry-Perot filter manufacturing process utilizing 7 processing steps, 128 different filter center wavelength elements can be fabricated. In an example of implementation and operation, the 128 different filter center wavelength elements available can be used to adapt the filter array to target filter wavelengths for integration on a spectral image sensor image sensor in order to pre-compensate the filters for the expected CRA shift.

In an example, filter pattern arrays may be pre-compensated in radial fashion on the sensor. In another example, the pattern can be diamond shaped. FIG. 6A illustrates an example of a pre-compensated filter array layout with 9×9 mosaics, each with 9 filters. In a specific example, the filters can have a cwl between 922 nm and 980 nm. FIG. 6B illustrates a shift in filter id resulting from pre-compensation of a filter array, such as the filter array layout of FIG. 6A.

In an example, additional, higher resolution filter elements can be utilized. For example, an array can utilize more filters in a given mosaic (i.e. more filters per sensor) to provide for a smoother pre-compensation transition from the center of an image sensor array to the edges of the sensor array. In another example, a a filter pattern and/or resolution may be designed to match the filter array to a particular lens and/or lens stack. In a specific example, a spectral image sensor requiring lower image resolution, but high spectral resolution may incorporate a larger mosaic is with more filter elements, whereas a spectral image sensor requiring higher image resolution may be designed to use larger but fewer individual filter elements for each sensor element.

Various manufacturing techniques can be used to form the pre-compensated filter arrays. In a specific example of implementation, a relatively thick "cavity" layer material can be deposited over a bottom mirror, then masked and etched in successive steps to provide different and progressively thinner cavity thicknesses. In an example, N−1 masking steps would be required to manufacture N cavity thicknesses for filters. In another example, the cavity thickness can be further tuned, and decrease the impact of discrete steps between different etch masks, pixel level tuning of the cavity thickness may be achieved by using sub-pixel level layout techniques and/or process tuning. In a specific example illustrated in FIG. 7A, a half-half pixel comprising 2 Fabry-Perot filters with different center wavelengths can be used to generate a combined response with a center wavelength (cwl) that is the average of the 2 original center wavelengths.

FIG. 7B illustrates pairs of adjacent interference filters 40A-40F associated with a single optical sensor 50. In an example, incident light passing through both of adjacent filters 40A and 40B is detected by the single optical sensor 50. In an example of implementation and operation, a sensor system includes an array of optical sensors and a plurality of spectral filters arranged in an array proximate to the array of optical sensors. In an example, the spectral filters are interference filters, such as Faby-Perot filters or plasmonic interference filters and organic filters. In a specific example, an optical sensor is associated with two or more spectral filters of the plurality of spectral filters, with each spectral filter of the plurality of spectral filters configured to pass light of a selected wavelength range. In the example, the two or more spectral filters of the plurality of spectral filters are configured to pass light in substantially adjacent wavelength ranges, so that sensor 50 receives effectively double the wavelength of either of the interference filters 40A or 40B alone.

FIG. 7C illustrates another example of pairs of adjacent interference filters 40A-40F associated with single optical sensors 50 incorporating an intermediate element 54 between the filters and sensors. In an example of implementation, the intermediate element 54 is located under the intersection of adjacent filters 40A and 40B and an optical sensor 50. In an example, the intermediate element 54 is a dead space between interference filters 40A-40F and optical sensors 50.

In yet another specific example of implementation, a process optimization can enable local tuning of the cavity thickness by controlling the speed and/or efficiency of etch processes locally using subpixel level layout techniques. Example etch processes include, but are not limited to, wet etch processes, reactive ion etch (RIE) processes and deep reactive ion etch process (DRIE).

FIGS. 8A-8C illustrate filter patterns for spectral filters (such as Fabry-Perot filters) for use in spectral image sensors. In FIG. 8A a filter mosaic includes 4×4 (16 band) filters repeated in a 15×15 array. In an example of implementation and operation, a mosaic pattern can be implemented as a structured layout, such as an extended Bayer filter pattern. In the example, macro-pixels of 4×4 filters are used in a repeating pattern across a spectral image sensor. FIG. 8B illustrates an alternative filter structure in which a spectral image sensor can include "patches" for each of the filters being implemented. FIG. 8C illustrates yet another alternative filter structure, where each of the patches illustrated in FIG. 8B is associated with multiple pixels. In the example of FIG. 8C 4 pixels are represented for each different filter patch.

FIG. 8D provides a top-down illustration of a filter mosaic pattern for a spectral sensor that includes a large filter element. In the example, a 6-filter mosaic includes standard filter elements 22B, 22C, 22D and 22E with a single filter element 22F that occupies the space of 4 standard filter elements. In an example, the larger filter element 22F can provide for a 6-channel filter response in situations where some filter response requirements dictate increased light capture, such as when a wavelength range requires a filter with reduced transmission properties. In a specific example, a set of interference filters can be arranged in a pattern that further includes an interference filter that is respectively larger in size than at least one other interference filter in the set of interference filters.

FIG. 8E provides a top-down illustration of another filter mosaic pattern for a spectral sensor that includes filter elements forming larger oblong shapes. In the example, large filter element 28A and large filter element 28B are included in a filter mosaic with 17 standard filter elements, such as, for example, filter elements 28A-28D. In an example, the inclusion of larger filter elements can provide for a 19-channel filter response in situations where some filter response requirements dictate increased light capture, such as referenced with reference to FIG. 8D. In an example, a spectral filter mosaic can include an interference filter that is respectively larger in size than at least one other interference filter in the set of interference filters and/or is in an elongated rectangular shape.

FIG. 8F provides a top-down illustration of an filter mosaic pattern for a spectral sensor with filter elements forming progressively smaller rings around a central filter element. In the example, smaller filter element of 26D, is surrounded by larger filter element 26C, which is surrounded be an even larger filter element 26A, all of which are surrounded by large filter element 26B. In an example, the progressively larger filter elements can provide for a 4-channel filter response in situations where some filter response requirements dictate increased light capture, such as referenced with reference to FIG. 8D. In an example spectral filter mosaic, one or more interference filters are respectively larger in size than at least one other interference filter in the set of interference filters and/or is adapted to form a ring around the other interference filters in the set of interference filters.

FIG. 9 illustrates an example filter response for a target or center pixel and adjacent "neighbor" pixels of a spectral image sensor. Smaller filters (relative to the associated sensor elements) generally result in a higher amount of cross-talk, whereas larger filters generally exhibit lower cross-talk, but lower resolution as well. Accordingly, the smaller the filter segments, and the closer the filter segments are to each other, the larger the cross-talk magnitude will be.

This cross-talk may originate, for example, from optical cross-talk or electrical cross-talk in the detection substrate of the pixel sensors. In an example, as pixel size approaches 1 micrometer (μm) in size, undesirable cross-talk can prevent the use of filters smaller than 3 μm.

In the example of FIG. 9, the filter response of each pixel is imperfect due to cross-talk between adjacent pixels-filters. As a result of the cross-talk, bumps in the spectrum may appear due to this cross-talk. For example, absent cross-talk, the filter response of pixel #13 would be expected to be a substantially symmetrical single peak. However, the filter response includes relatively smaller peaks on the shoulder of the single peak at approximately the center frequencies of pixels #14, #8, #12 and #18, due to cross-talk from the adjacent filters. This cross-talk results in spectral impurity in the data collected from sensor output.

In an example, cross-talk can be attenuated or removed by utilizing device improvements, or by post-processing the data applying spectral corrections. In a specific example of implementation and operation referring to FIG. 9, spectral corrections can utilize the output of filter #13, for example, to correct for the output of filter #12. In the example, cross-talk from filter #12 is contributing to the spectral impurity for the filter response of pixel #13 and can thus be used to correct for its contribution to the filter #13 response. Accordingly, using a subset of filter responses, a correction step can be implemented to attenuate or reduce the cross-talk contribution to a given pixel output. In a specific example, a matrix multiplication of the output spectrum with a correction matrix can result in a substantially corrected output.

FIG. 10 provides a top down view of an example spectral image sensor utilizing multiple pixels for a single filter. In a specific example of implementation and operation, each spectral filter 60A-60H is associated with 9 pixels, such as pixels 1-9, spatially distributed under a filter 60H, where each of the different spectral filters 60A-60H have been indicated with different fill patterns. In the example, since pixel 1 is adjacent and closer to the leftmost, topmost and top left corner of the center spectral filter 60H, it will exhibit more cross-talk from the top left (filter 60C), top center (filter 60D) and adjacent left center (filter 60B) filters in its spectral response than pixels 2-9 pixels associated with filter 60H. In an example, each of the pixels associated with the central filter element 60H can accumulate different amounts of cross-talk from each other spectral filter (filters 60A-60G) in the mosaic. In a further example, when combined with spatially distributed pixels under each filter, the cross-talk contribution from each given spectral filter can be used to provide a "gradient" of cross-talk for each of the several pixels associated with a spectral filter array. In an example, the center pixel (#5) associated with the center spectral filter element 60H will accumulate the least amount of cross-talk from adjacent spectral filter elements, with a similar contribution from the leftmost (60B), rightmost (60F), topmost (60D) and bottommost (60H) filters, and similar contribution (though attenuated) from the corner filters 60C, 60E, 60A and 60G.

In a specific example of implementation and operation, a plurality of pixels are associated with each spectral filter, as opposed to a single filter associated with a single pixel. In the example, because each pixel suffers from a different cross-talk contribution for light passing through spectral filters around the spectral filters associated with that pixel, the output of a given pixel can be used to spectrally correct the outputs of nearby pixels. In a specific example referring to FIG. 9, each of pixels #1-#9 measure the response of 1 desired filter response and cross-talk from 8 responses for adjacent spectral filters that are spatially modulated atop the 9 pixels. Accordingly, in a specific example of implementation, the 9 spectral filter responses provide 9 unknowns with 9 equations to solve, allowing a corrected response to be calculated. In another example, the spectral responses of each pixel in adjacent filters is also available and can be used in a large spectral correction algorithm that accommodates each spectral response to solve for a corrected response. Example methods include, but are not limited to, matrix multiplications and more advanced corrections such as linear, non-linear, and/or neural net-based models.

In yet another example of implementation, cross-talk corrections need not be based on physical models of cross-talk alone, rather they can also be based at least partially on measured cross-talk and other cross-talk surrogates. Cross-talk correction methods may utilize one or more of the spectral response of all available pixels within a given filter segment, the spectral response of all adjacent filter pixels and the spectral response of all pixels within a spectral image sensor.

As applied to the examples described above, a spectral filter structure with multiple pixels under a single filter can be used to increase sensitivity and/or spatial resolution of a spectral image sensor. For example, a "de-mosaicing" algorithm can be used to increase the spatial resolution of a spectral image sensor using the multiple pixels per spectral filter while retaining large filter patterns which benefit from low cross-talk due to geometric design enhancements.

Integrated interference filters (such as Fabry-Perot filters) can be used on a patterned optical sensor to implement a spectrometer. In an example, a spectrometer can be implemented by integrating filters with different center wavelengths (cwl) onto different optical pixels. In an example, each pixel is designed to correspond to received light associated with a respective cwl. By combining the information derived from each of pixel in a set of pixels, a spectrum can be reconstructed using one or more algorithms. The algorithms can be based on one or more of linear, non-linear, or neural net-based models.

Referring to the filter array illustrated in FIG. 1, each filter of a set of filters can occupy a different physical location relative to an associated optical sensor. These differences in physical location relative to the optical sensor can result in response aberrations. In an example, light projected on an optical sensor may be non-uniform over the optical sensor plane (sometimes called "shading") and/or the angular distribution of projected light may be altered over the optical sensor plane depending on the scene optics for which a spectrum is being measured.

In a specific example of implementation and operation, a sensor system includes a plurality of sets optical sensors arranged on an integrated circuit, the plurality of sets optical sensors having a respective top surface. The sensor system includes an interface between the plurality of optical sensors and a processing device configured to transmit information there between and an array of optical filters having a respective bottom surface and a respective top surface, where the bottom surface of the optical filter array is located proximal to the top surface of the plurality of sets optical sensors and each optical filter of the optical filter array is configured to pass a target wavelength range of light to a set of optical sensors. The processor is configured to receive an output from each optical sensor in a set of optical sensors and determine a corrected filter response for the set of optical sensors using crosstalk from light transmitted through optical filters adjacent to the set of optical sensors.

In a specific related example, the array of optical sensors has a respective 4 sides, where each optical filter that is adjacent to a side of the array of optical sensors is configured to pass a different target wavelength range of light. In another example, crosstalk from light transmitted through optical filters adjacent to the array of optical sensors is different for each optical sensor in the array of optical sensors.

In a specific example of implementation and operation a sensor system includes a plurality of filters implemented within an integrated circuit, where each filter of the plurality of filters is configured to pass a target wavelength range of light. In an example, a plurality of sets of optical sensors are also implemented within the integrated circuit, where each set of optical sensors includes a corresponding plurality of optical sensors, and each filter of the plurality of filters is associated with a corresponding set of the plurality of sets of optical sensors. In an example, based on incident light passing through the plurality of filters, the plurality of sets of optical sensors are configured to generate a plurality of sets of optical sensor output signals such that each optical sensor is configured to generate a corresponding optical sensor output signal of the plurality of a set of optical sensor output signals. In an example, the sensor system further includes memory that stores operational instructions and one or more processing modules operably coupled to the plurality of sets of optical sensors and the memory that are configured to execute the operational instructions to process a first set of optical sensor output signals of the plurality of sets of optical sensor output signals to determine a contribution of the incident light passing through a first filter of the plurality of filters that services a first set of the plurality of sets of optical sensors and to substantially remove any contribution of the incident light passing through any filter of the plurality of filters that is adjacent to the first filter of the plurality of filters.

In specific example, the first set of optical sensors is arranged in an array. In an other example, the array of optical sensors has a respective 4 sides, where each optical filter adjacent to a side of the array of optical sensors is configured to pass a different target wavelength range of light. In yet another example, the first set of optical sensors is arranged in at least one of a 2×2 array, a 3×3 array, a 4×4 array and a 5×5 array and in another example, the one or more processing modules is further configured to execute the operational instructions to process a spectral content of the first set of optical sensor output signals to identify spectral content that is not contributed by the first filter of the plurality of filters that services the first set of optical sensors of the plurality of sets of optical sensors and remove at least a portion of the spectral content that is not contributed by the first filter of the plurality of filters.

In a related example, spectral content of the first set of optical sensor output signals includes spectral content from each optical sensor of the first set of optical sensors. In another example, the operational instructions include a spectral correction algorithm, where the spectral correction algorithm is adapted to process a spectral content of the first set of optical sensor output signals to determine the contribution of the incident light passing through any other filter of the plurality of filters that is adjacent to the first filter of the plurality of filters and remove the contribution of the incident light passing through any other filter of the plurality of filters that is adjacent to the first filter of the plurality of filters from the output signals for the first set of optical sensors. Candidate spectral correction algorithms include one or more of a matrix multiplication, a linear algorithm, a non-linear algorithm and a neural network-based algorithm.

In yet another specific example of implementation and operation, the one or more processing modules are configured to execute the operational instructions to process optical sensor output signals from one or more optical sensors in another set of optical sensors, where the another set of optical sensors is adjacent to the set of optical sensors and based on the processed optical sensor output signals from the one or more optical sensors in another set of optical sensors, facilitate removal of a contribution of the incident light passing through an optical filter associated with the another set of optical sensors.

In another specific example of implementation and operation, a method for execution by one or more modules of one or more computing devices of a sensor system begins by receiving an output from each optical sensor in a set of optical sensors, where a plurality of sets of optical sensors is arranged on an integrated circuit and the plurality of sets optical sensors has a respective top surface, wherein the bottom surface of an optical filter array is located proximal to the top surface of the plurality of sets optical sensors, with the optical filter array having a respective bottom surface and a respective top surface and each optical filter of the optical filter array is configured to pass a target wavelength range of light to a set of optical sensors. The method continues by generating an optical sensor output signal from the output from each optical sensor in the set of optical sensors to produce a set of optical sensor output signals and by processing the set of optical sensor output signals to determine a contribution of light passing through an optical filter of the plurality of optical filters associated with the set of optical sensors. The method then continues by substantially removing any contribution of light passing through any optical filter of the optical filter array that is adjacent to the optical filter of the plurality of optical filters.

FIG. 11A illustrates an example response for a filter receiving collimated light at a desired center wavelength (cwl). The optical transmission of a Fabry-Perot filter depends at least partially on incident light distribution for the optical system. In the example of FIG. 11 the transmission of a Fabry-Perot filter is shown when perfectly collimated light is projected orthogonally on the Fabry-Perot filter at cwl λ. As illustrated, the pass-band of transmission for the selected Fabry-Perot filter can be characterized by center wavelength (cwl) λ and a Full-width at half max (FWHM). In the example, the filter parameters can be impacted by the angular distribution of incident light projected on the Fabry-Perot filter. For example, when collimated light is projected onto the Fabry-Perot filter at an angle θ wrt to normal, the cwl will shift to shorter wavelengths. In the first order, this cwl-shift can be approximated as:

$$\Delta\lambda_{cwl} \approx \lambda_{cwl}\left(1 - \cos\frac{\theta_{CRA}}{n_{\mathit{eff}}}\right)$$

FIG. 11B provides a side cross-sectional view of a sensor module 110 that includes a package 116 incorporating a package aperture 112. In an example, incident light enters the package through package aperture 112, where it is ultimately collected at light sensor 124. Package 116 can be constructed of various opaque or semi-opaque materials, including metals, composites and synthetic or semi-synthetic organic compounds, along with combinations of same.

In an example, package aperture 112 can be adapted to include a material capable of passing light, including glass (such as quartz or $SiO_x$), clear synthetic or semi-synthetic organic compounds (such as cellophane, vinyl or plexiglass) or any other material that does not significantly absorb light within wavelengths of interest for the spectral sensor module 10. Package aperture 112 can be adapted to prevent foreign materials from entering the cavity defined by package 116, or it can be a simple opening for light entering the cavity. In another example, the package aperture 112 can be adapted to provide additional functionality, such as variable opening size (variable aperture), light focusing, and rejection of selected optical wavelengths and/or electromagnetic radiation.

Light sensor 124 includes light sensitive elements (sensors) 128 embedded in a substrate 126. In an example, light sensitive elements 128 can be any of complementary metal oxide semiconductor (CMOS), sensors, charge-coupled device (CCD) sensors and colloidal or quantum dot-based optical sensors, along with combinations of these sensors. In an example, light sensitive elements 128 can be configured to detect light in the visible, near-infrared (NIR), mid-infrared (MIR) or ultraviolet (UV) or combinations from this group. In an example, spectral filter 122 comprises multiple spectral filter elements integrated on light sensor 124. In a specific example, spectral filter 122 comprises a plurality of filters adapted to pass light in a spectrum of light wavelengths and is manufactured on top of subsequent to back-end-of line (BEOL) processing of light sensor 124. In an example, an integrated spectral filter 122 includes multiple spectral filter elements, each associated with one or more light sensitive elements 128. In a specific example, the integrated spectral filter elements of spectral filter 122 can include different filter types, including interference filters, such as Fabry-Perot filters and absorption filters, such as plasmonic filters and quantum dot filters, either alone or in combination.

Sensor module 110 can include additional optical elements, such as rejection filter 120 and micro-optical element 118 located within the cavity of sensor module 110. In an example, rejection filter 120 can include a plurality of rejection filter elements, while micro-optical element 118 can include micro lenses, micro apertures, diffusers and other related optical elements. In an specific example of implementation, sensor package 110 is implemented as a sensor system including macro-optical element 114. In an example, macro-optical element 114 can be a single element or a plurality of optical elements that are each larger than the individual elements of micro-optical element 118.

In a specific example of implementation and operation, a package 116 having a respective top surface, a respective bottom surface and a respective plurality of side surfaces with the top surface including a package aperture 112, the top surface, the plurality of side surfaces and the bottom surface forming a cavity. In an example, a substrate 126 having a respective bottom surface and a respective top surface is located within the cavity of package 116, the bottom surface of the substrate 126 being coupled to the bottom surface of the package 116 and a plurality of light sensitive elements 128 are located on the top surface of the substrate 126. In the example, a plurality of sets of spectral filters are configured as a plurality of sets of optical filters (spectral filter 122) having a respective top surface and a respective bottom surface located atop the plurality of light sensitive elements 128, where a set of spectral filters of the plurality of sets of optical filters includes a plurality of spectral filters that are arranged in a pattern where each spectral filter of the plurality of spectral filters is configured to pass light in a different wavelength range.

In a related example, one or more rejection filters is configured as a layer (such as rejection filter 120) having a respective top surface and a respective bottom surface, the bottom surface of the one or more rejection filters being proximate to the top surface of the plurality of sets of sets of spectral filters. In an example, a cover is located at least partially within the package aperture 112 and in a specific example, one or more macro-optical elements 118 are located within the cavity of package 116. In an example, macro-optical element 118 is a single lens or a collection of lenses adapted to direct light through package aperture 116.

In a specific example of implementation an operation the wavelength sensitivity of a light sensitive element, such as one or more of light sensitive elements 128 is matched to a particular spectral filter element of spectral filter 122 to provide a light sensitive element and optical filter pair. In an example, the quantum efficiency of a particular light sensitive element (such as one or more of light sensitive elements 128) is adapted to be sensitive within a predetermined wavelength range by adjusting the full-well, the conversion gain and/or the area of the particular light sensitive element. In a related example, a sensor system includes a plurality of sets of optical filters, where a set of optical filters of the plurality of sets of optical filters includes a plurality of optical filters that are arranged in a pattern, where each optical filter of the plurality of optical filters is configured to pass light in a different wavelength range.

FIG. 12A provides a side view of an example sensor system using Fabry-Perot filters. In the example, an optical window or aperture control device 70 (aperture) intercepts incident light 0 striking the surface beyond a certain angle, thereby controlling the angular distribution of incident light projected on integrated Fabry-Perot filters 74 and 76 proximal to optical sensor 78. The resulting angular distribution of light on the Fabry-Perot filters for systems such that illustrated by FIG. 12A depends heavily on the angular distribution of the light and/or scene under observation. FIG. 12B provides another side view of an example spectrometer using Fabry-Perot filters illustrating angular distribution for 2 different light sources (source #1 and source #2). In the example, incoming light rays from source 1 (incident light 1), both filters (74 and 76) receive light, but with a different incident light angle. Incoming light rays from source 2 (incident light 2) exhibit even more extreme differences in incident light angle, as filter 76 doesn't receive light from this source at all.

In an example, adding one or more components to the optical system can reduce the correlation of scene optics to the projected angular distribution on an optical sensor. FIG. 12C provides a side view of an example spectrometer with an optical diffuser element 84 provisioned before incoming light rays pass through the aperture 70. Example optical diffusers include, but are not limited to, ground glass or holographic diffusers. An ideal optical diffuser will fully randomize the outgoing light angle exiting the diffuser, irrespective of the incident angle of incoming light rays. Ideal optical diffusers are sometimes referred to as perfect Lambertian diffusers.

As the examples of FIGS. 12A-12C illustrate, the performance of a spectrometer using Fabry-Perot filters is highly dependent on the performance of the optical diffuser element used. Optical diffusers with acceptable performance are necessarily one of more of difficult to manufacture, more expensive, thicker and result in a system that is less efficient with respect to optical power throughput from a source to the optical sensors.

Non-ideal optical diffuser elements can have artifacts that will exhibit spatial effects/anomalies on the optical sensor such as shading across the sensor. Additionally, different optical pixels on the optical sensor can receive light with varying angular distributions depending on the scene optics. Since filters targeting different center wavelengths (cwl) are distributed across a spectral sensor to construct a spectrometer, spatial artifacts can lead to aberrations in the final spectrum. In an example, aberrations resulting from optical diffuser derived spatial artifacts can cause filters on one side of a spectral sensor to receive a different amount of light than filters on another side of the spectral sensor due to shading. The resultant shading, combined with the spatial distribution of the filters across the sensor, can exhibit as a recoloring of the spectrum across the sensor.

FIG. 12D illustrates scattering from a diffuser element in a sensor system. In order to protect a sensor system comprising light sensing elements, integrated filters, rejection filters and micro-optical elements, a package can be used to contain the sensor system. Referring to FIG. 11B, in an example, a sensor system package can include one or more apertures through which light from a region of interest passes into the interior of the packaging. In a specific example of implementation, the walls of the container can be opaque to the wavelengths of interest.

In an example of implementation and operation, some light that enters a sensor system package fails to reach the sensor, due to the light having the wrong angle-of-incidence or reflecting onto other elements of the system. Not all the light that enters the container reaches the light sensitive elements. Some factors preventing light from reaching the light sensitive elements include wrong angles of incidence and reflections due to different elements of the sensor system. In an example, a sensor system can be modified so that light that would otherwise be rejected or impeded from reaching the light sensitive elements is redirected and reaches at least one light sensing element. In an example, a diffuser, such as the diffuser of FIG. 12C can be used to redirect light towards the light sensitive elements, however, as illustrated, diffusers also scatter a considerable amount of light away from the light sensitive elements.

FIG. 12E illustrates a sensor system utilizing a modified diffuser element. In an example, the diffuser is partially surrounded by a reflective surface creating an integrating sphere to redirect light back to the diffuser, increasing the probability of the light reaching the light sensitive elements. In a related example, the entrance and/or exit surface of the diffuser is modified with a rough surface to further redirect the light in the direction of the light sensitive elements. In an example, the rough surface can be created using various methods, such as sandblasting or grinding.

In a specific example of implementation and operation, A sensor system includes a plurality of sets of optical sensors, the plurality of sets of optical sensors having a respective top surface and a respective bottom surface and a plurality of sets of optical filters configured as a layer having a respective top surface and a respective bottom surface located atop the plurality of optical sensors. In the example, a set of optical filters of the plurality of sets of optical filters includes a plurality of optical filters that are arranged in a pattern, where each optical filter of the plurality of optical filters is configured to pass light in a different wavelength range. In an example, a diffusion element having a respective top surface, a respective plurality of side surfaces and a respective bottom surface, is located above the top surface of the plurality of optical filters.

In an example, at least a portion of the plurality of side surfaces of the diffusion element is adapted to reflect light. In an example, at least a portion of the top surface of the diffusion element is adapted to include a rough surface, where the rough surface is a surface that has been treated with a roughening process. In a related example, the roughening process includes at least one of grinding, abrasive blasting, ion milling, atom bombardment or etching. In another example, at least a portion of the top surface of the diffusion element is adapted to reflect light. In yet another example, at least a portion of the bottom surface of the diffusion element is adapted to reflect light. In another example, at least a portion of the bottom surface of the diffusion element has been adapted to include a rough surface, where a rough surface is a surface that has been treated with a roughening process and mirror material creates miniature integrating spheres, limiting the re-emission of surface light to a 'receiving area' and the 'transmitting area.

Interference-based filters such as Fabry-Perot filters, are configured to reject light of wavelengths outside a predetermined transmission spectrum. Additionally, interference-based filters can fail to transmit some light of wavelengths inside the predetermined transmission spectrum, with a portion of the light being reflected at the surface of the filter(s). In an example, the high reflectivity of the mirrors used in Fabry-Perot filters (such as Bragg mirrors) contribute to the failure to transmit some light of wavelengths inside the predetermined transmission spectrum.

FIG. 12F provides a side-view of a spectrometer system illustrating changes to measured center wavelengths based on the angle of incidence of incoming light. In the example, a group or set of light sensing elements 86 are located under a single interference-based filter 84 to form macro-pixel 80. In the example, the group of light sensing elements 86 are configured as a layer (such as having a respective top surface and a respective bottom surface, with the single interference-based filter 84 having a respective top surface and a respective bottom surface, the bottom surface of the single interference-based filter 84 being proximate to the top surface of the group of light sensing elements 86. In an example, a single aperture 88 having a respective top surface and a respective bottom surface is positioned above the single interference-based filter 84. In an example, the size of the single aperture 88 and its position relative to the individual light sensitive elements in the group of light sensitive elements 86 defines an angle of incidence of incoming incident light to the individual light sensitive elements of the group of light sensing elements 86. In an example, the angle of incidence of incoming incident light defines the transmitted spectrum of the single interference-based filter 84 in the direction of each light sensitive element 86, accordingly each light sensitive element of the group of light sensing elements 86 can measure a different spectral profile with respect to other light sensing elements of the group of light sensing elements 86 comprising macro-pixel 80.

In a specific example, an output from different light sensing elements of a group of light sensing elements 86 comprising macro-pixel 80 can be used to measure different spectral responses, where the different spectral responses are due at least in part to different center wavelengths of light reaching the different light sensing elements of the group of light sensing elements. In an example, the spectral responses resulting from the varying center wavelengths of light can result in a slightly modified measured spectrum.

In a specific example of implementation and operation, a sensor module includes a substrate having a respective bottom surface and a respective top surface, with one or more sets of light sensitive elements located on the top surface of the substrate. The sensor module further includes one or more interference filters configured as a layer having a respective top surface and a respective bottom surface, where the bottom surface of the one or interference filters is located atop the one or more sets of light sensitive elements and where each interference filter of the one or more interference filters is configured to pass light in a predetermined wavelength range. Each interference filter of the one or interference filters is associated with a set of the one or more sets of light sensitive elements. The sensor module further includes one or more apertures, each having a respective top surface and a respective bottom surface, where the bottom surface of each aperture is located above an interference filter of the one or more interference filters. In a specific related example, each of the one or more apertures has a respective width and depth, the width and depth of the aperture together defining an angle-of-incidence of light received at the top surface of the one or more interference filters. In another specific related example, the location of each light sensitive element of the set of light sensitive elements can be adapted to provide increased spectral resolution for the sensor module based on the angle of incidence of light received at each interference filter of the one or more interference filters.

FIG. 12G provides a side-view of another spectrometer system illustrating changes to measured center wavelengths based on the angle of incidence of incoming light. In an example, an aperture, such as the aperture described in reference to FIG. 12F, is offset relative to the center of the macro-pixel. In an example, the offset aperture extends the range of angles for the angle of incidence received at the light sensing elements of the group of light sensing elements comprising the macro-pixel. FIG. 12H provides a top-down view of an offset aperture with respect to the center of a macro-pixel. In an example, locating the aperture closer to a corner of a macro-pixel comprising a group of light sensitive elements can provide a relatively broader distribution of angles-of incidence for the group of light sensing elements which can be used to provide relatively more broad spectral spread for the measure spectrum.

FIG. 12I provides a side-view of a spectrometer system illustrating macro-pixels associated with interference-based filters and apertures. In an example, groups of light sensing elements comprising macro-pixels in a spectrometer system are associated with interference-based filters having different transmission profiles, with each interference filter having an associated aperture.

In a specific example of implementation and operation, a sensor module includes a substrate having a respective bottom surface and a respective top surface, with a plurality of sets of light sensitive elements located on the top surface of the substrate. The sensor module further includes a plurality of interference filters configured as a layer having a respective top surface and a respective bottom surface, where the bottom surface of the plurality of interference filters located atop the one or more sets of light sensitive elements and where each interference filter of the plurality of interference filters is configured to pass light in a predetermined wavelength range. Each interference filter of the plurality of interference filters is associated with a set of the plurality of light sensitive elements. The sensor module further includes a plurality of apertures, each having a respective top surface and a respective bottom surface, where the bottom surface of each aperture of the plurality of apertures is located above an interference filter of the plurality of interference filters. In a specific related example, each aperture of the plurality of apertures has a respective width and depth, the width and depth of the aperture together defining an angle-of-incidence of light received at the top surface of the one or more interference filters. In another specific related example, at least some interference filters of the plurality of interference filters is configured to pass light in a different wavelength range. In yet another specific related example, the width and depth of at least some apertures of the plurality of apertures is configured to provide different ranges for angles-of-incidence of incoming light.

In a specific related implementation example, different apertures of the plurality of apertures can be separated by and/or associated with opaque regions, with a reflective layer deposited on the bottom surface of the aperture in the opaque regions. In an example, light reflected at the top surface of an interference filter of the plurality of interference filters can be subsequently reflected at the bottom surface of the opaque regions until it reaches an interference-based filter with the desired parameters for transmission. In an example, each interference filter of the plurality of interference filters is separated from adjacent interference filters with an airgap. In an alternative example, each interference filter of the plurality of interference filters is contiguous with one or more adjacent interference filters.

FIG. 12J provides a side-view of the example spectrometer system of FIG. 12I illustrating light propagation with reflective apertures. In the example, two incoming light rays with different central wavelengths λ1 and λ2 pass through the left aperture. In the example, filter 1 (FP1) is designed to transmit light with wavelength λ1 and reject other wavelengths; as a result, light with wavelength λ2 is rejected. In an example, by including a reflective layer on the opaque bottom surface between the plurality of apertures, rejected light is reflected to other interference filters until it reaches a filter (FP2) that allows wavelength λ2 to transmit through.

FIG. 12K provides a side-view of another spectrometer system illustrating macro-pixels associated with interference-based filters and apertures. In the example, a plurality of interference-based filters are associated with a single macro-pixel and an aperture. In an example, the angle of incidence of incoming light from an aperture can be compensated for by incorporating interference-based filters with predetermined transmission characteristics. In a specific example of implementation and operation, a sensor module includes a substrate having a respective bottom surface and a respective top surface, with a plurality of sets of light sensitive elements located on the top surface of the substrate. The sensor module further includes a plurality of sets of interference filters configured as a layer having a respective top surface and a respective bottom surface, where the bottom surface of the plurality of sets of interference filters is located atop the one or more sets of light sensitive elements and where each interference filter of the plurality of interference filters is configured to pass light in a predetermined wavelength range. In an example, each interference filter of a set of interference filters is associated with a set of light sensitive elements. The sensor module further includes a plurality of apertures, each having a respective top surface and a respective bottom surface, where the bottom surface of each aperture of the plurality of apertures is located above a set of interference filters. In an example, the predetermined transmission characteristics for at least some of the interference filters are determined based on angles of incidence for light passing through an aperture associated with those interference filters and a micropixel. In the example, the predetermined transmission characteristics for the interference filters are further determined to compensate for select angles of incidence of light passing through the associated aperture.

FIG. 12L provides a side-view of another spectrometer system illustrating macro-pixels associated with interference-based filters and apertures. In the example, each of a plurality of macro-pixels and its corresponding apertures are located adjacent to each other and provide a macro-pixel and aperture pair. In an example, interference-based filters associated with a macro-pixel and aperture pair are arranged so that light sensitive elements in a group of light sensitive elements comprising a macro-pixel can receive light with angles of incidence sufficient to cross more than one aperture with substantially a same angle of incidence. In a specific example, light of sufficient angles of incidence passing through adjacent apertures can overlap at an interference-based filter common to adjacent macro-pixels.

In an example, angle selecting elements can be structured to provide various types of control for light passing through an aperture. Example structures can be found in FIGS. 12A-12F of U.S. patent application Ser. No. 17/007,254, which is incorporated herein by reference in its entirety.

FIGS. 12M and 12N provide side-views of a spectrometer system illustrating the use of a lens to control the angle of incidence received at a macro-pixel. In the example of FIG. 12M, an aperture having a respective top surface and a respective bottom surface includes a lens having a respective top surface and a respective bottom surface located with the bottom surface of the lens directly atop the top surface of the aperture, with the bottom surface of the aperture facing one or more macro-pixels. In an example, the top surface of the lens is adapted to narrow an angle of incidence of incoming incident light on a single interference filter of a macro-pixel. In the example of FIG. 12N, the top surface of the lens is adapted to narrow an angle of incidence of incoming incident light on a set of interference-based filters associated with a macro-pixel.

In the example, one or more lenses can be used to redirect incident light rays coming from wide angles in the direction normal to the surface of an image sensor incorporating macro-pixels, creating a substantially collimated beam.

FIG. 12O provides a side-view of a spectrometer system illustrating the use micro-lenses to control the angle of incidence received at a macro-pixel. In an example, a plurality of macro-pixels are associated with a plurality of apertures to create macro-pixel and aperture pairs, where an array of micro-lenses is configured such that each micro-lens of the array is associated with an aperture of a macro-pixel and aperture pair.

FIG. 12P provides a side-view of another spectrometer system illustrating the use micro-lenses to control the angle of incidence received at a macro-pixel. In an example, a plurality of macro-pixels are associated with a plurality of apertures to create a plurality of macro-pixel and aperture pairs. In the example, each aperture is further associated with a micro lens, such that the angle of incidence of light passing through the aperture includes angles of incidence sufficient to pass to adjacent macro-pixel and aperture pairs. In an example, individual light sensitive elements at a boundary of a group of light sensitive elements comprising a macro-pixel can receive light crossing from an adjacent macro-pixel and aperture pair. In an example, light with a substantially same angle of incidence can be detected by light sensitive elements at the boundary of two adjacent macro-pixels.

FIG. 13A provides a top-down illustration of an example optical filter layout for shading compensation. In an example of implementation and operation, spatial allocation of different optical filters over the optical pixels of an optical pixel array can be substantially optimized by duplicating each filter so that a final spatial layout of the optical filters achieves point symmetry around an optical axis. The point of symmetry is described as the point where 2 orthogonal lines of symmetry cross, where both of the orthogonal lines are orthogonal to the optical axis in the system (a point on either line has a matching part the same distance from the central point, but in the opposite direction). In an example, with an optical filter layout such as that illustrated in FIG. 13, a positive aberration projected on a filter on one edge will be compensated by a negative aberration projected on a filter on the other edge of the sensor. In a specific example, summing filter responses from optical filters with the same cwl would substantially compensate for shading or other aberrations. In a specific example, summed filter responses can be averaged for each optical filter designed to pass light at a same cwl. In yet another example, measurement from the several filter locations with same cwl may be used to compensate the shading using advanced algorithms that can be adapted to take into account knowledge of the optical system for a given spectral image sensor. In another example, all filter responses are taken into account to compensate for shading.

FIGS. 13B and 13C provides additional top-down illustrations of example optical filter layouts for shading compensation. In the example layout, 4 quadrants of optical filters are horizontally or vertically mirrored versions of each other, where a given filter is repeated in each of the 4 quadrants.

FIG. 14A provides a naming convention for 4 quadrants of a common centroid optical filter layout. In the example, a point of symmetry is shown at the center point of the 4 quadrants. FIG. 14B provides an additional top-down illustration of an example optical filter layout for shading compensation. In a specific example, an optical filter layout with 4 quadrants can be further divided to provide additional axes of symmetry within each of the 4 quadrants, while maintaining symmetry of the 4 quadrants. In a specific example, adding a point of symmetry within each quadrant can improve the optical filter layout by minimizing aberrations across the spectral sensor while minimizing aberrations within each of the quadrant. Additional related examples include subdividing each quadrant even further, such as each quadrant including a 4 quadrant sub-quadrant with a point of symmetry and then 4 quadrants within each of the 4 quadrants of the sub-quadrants.

FIG. 15 provides an additional top-down illustration of an example 2×3 macro pixel mosaic optical filter layout for shading compensation. In the example, a mosaic optical filter layout uses optical filter patches sufficiently small that when repeated adequately shading effects are attenuated. In another example optical filter layout, the mosaic layout illustrated in FIG. 15 can be combined with the common centroid optical filter layout of FIG. 14B to produce a hybrid optical filter layout.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more examples have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more examples are used herein to illustrate one or more aspects, one or more features, one or more concepts, and/or one or more examples. A physical example of an apparatus, an article of manufacture, a machine, and/or of a process may include one or more of the aspects, features, concepts, examples, etc. described with reference to one or more of the examples discussed herein. Further, from figure to figure, the examples may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the examples. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more examples have been expressly described herein, other combinations of these features and functions are likewise possible. The present disclosure is not limited by the particular examples disclosed herein and expressly incorporates these other combinations.

What is claimed is:

1. A sensor system comprising:
   a plurality of optical sensors on an integrated circuit having a respective top surface and a respective bottom surface, wherein the plurality of optical sensors are configured in an array;
   a lens system located proximal to the top surface of the array, wherein an intersection of an optical axis of the lens system with the plurality of optical sensors defines a reference point for light passing through the lens system;
   a plurality of sets of optical filters overlaying the array between the lens system and the array, wherein each set of optical filters is associated with a set of optical sensors of the plurality of optical sensors, wherein a set of optical filters of the plurality of sets of optical filters includes a plurality of optical filters and each set of optical filters has a center wavelength for light transmitted through the set of optical filters, wherein each optical filter of the plurality of optical filters is configured to pass light in a different wavelength range, wherein at least some sets of optical filters are configured to provide a center wavelength that is higher than a center wavelength of a set of optical filters at the reference point; and
   an interface configured for receiving an output signal from the plurality of optical sensors, wherein the output signal is representative of received light from the plurality of optical sensors;
   one or more processors adapted to:
      determine a spectral response for each set of optical sensors associated with a set of optical filters.

2. The sensor system of claim 1, wherein the at least some sets of optical filters are further configured to provide increasingly higher center wavelengths as they extend radially from the set of optical filters at the reference point.

3. The sensor system of claim 2, wherein the increasingly higher center wavelengths are selected to substantially compensate for a wavelength shift associated with optical sensors of the plurality of optical sensors located farther from the reference point.

4. The sensor system of claim 1, wherein the at least some sets of optical filters are further configured to provide increasingly higher center wavelengths as they extend geometrically from the set of optical filters associated with the reference point.

5. The sensor system of claim 4, wherein the increasingly higher center wavelengths are selected to substantially compensate for a wavelength shift for optical sensors of the plurality of optical sensors located farther from the reference point.

6. The sensor system of claim 1, wherein the center wavelength of the set of optical filters at the reference point is a preferred center wavelength for the array of optical sensors, wherein the at least some sets of optical filters are adapted to compensate for an increasing chief ray angle for light passing through filters as they extend radially from the set of optical filters at the reference point.

7. The sensor system of claim 6, wherein the chief ray angle increases in accordance with the equation:

$$\Delta\lambda_{cwl} \approx \lambda_{cwl}\left(1 - \frac{\cos\cos\theta_{CRA}}{n_{\mathit{eff}}}\right),$$

wherein is wavelength, cwl is center wavelength, CRA is chief ray angle and $n_{\mathit{eff}}$ is effective refractive index.

8. The sensor system of claim 7, wherein a chief ray angle associated with the lens system contributes to the increasing ray angle.

9. The sensor system of claim 1, wherein the at least some sets of optical filters are configured to provide a center wavelength by increasing a cavity thickness for each filter in the at least some sets of optical filters.

10. The sensor system of claim 1, wherein the plurality of sets of optical filters include at least some interference filters.

11. The sensor system of claim 10, wherein the interference filters are Fabry-Perot filters.

12. A method of manufacturing a spectral imaging system, comprising:
   forming a plurality of optical sensors on an integrated circuit, wherein the plurality of optical sensors are configured in an array;
   overlaying the plurality of optical sensors with a plurality of sets of optical filters having a respective top surface and a respective bottom surface, wherein each set of optical filters is associated with a set of optical sensors of the plurality of optical sensors, wherein a set of optical filters of the plurality of sets of optical filters includes a plurality of optical filters and each set of filters has an associated center wavelength, wherein each optical filter of the plurality of optical filters is configured to pass light in a different wavelength range;
   locating a lens system proximal to the top surface of the plurality of sets of optical filters, wherein an intersection of an optical axis of the lens system with the plurality of optical sensors defines a reference point for light passing through the lens system; and
   wherein at least some sets of optical filters are configured to provide a center wavelength that is higher than a center wavelength of a set of optical filters at the reference point.

13. The method of claim 12,
   wherein the lens system is characterized as having a high chief ray angle (CRA) for light passing through the lens system, wherein a high CRA lens system allows transmission of light at an oblique angle when located in the spectral imaging system.

14. The method of claim 12, wherein the at least some sets of optical filters are further configured to provide increasingly higher center wavelengths as they extend radially from the set of optical filters at the reference point.

15. The method of claim 14, wherein the increasingly higher center wavelengths are selected to substantially compensate for a wavelength shift associated with optical sensors of the plurality of optical sensors located farther from the reference point.

16. The method of claim 12, wherein the at least some sets of optical filters are further configured to provide increasingly higher center wavelengths as they extend geometrically from the set of optical filters at the reference point.

17. The method of claim 16, wherein the increasingly higher center wavelengths are selected to substantially compensate for a wavelength shift associated with optical sensors of the plurality of optical sensors located farther from the reference point.

18. The method of claim 12, wherein the center wavelength of the set of optical filters at the reference point is a preferred center wavelength for the array of optical sensors, wherein the at least some sets of optical filters are adapted to compensate for an increasing chief ray angle for light passing through the optical filters as the at least some sets of optical filters extend radially from the set of optical filters at the reference point.

19. A sensor apparatus comprising comprises:
   a plurality of optical sensors on an integrated circuit, wherein the plurality of optical sensors are configured in an array;
   a lens system, wherein a chief ray angle (CRA) for light passing through the lens system increases for incident light passing through the lens system at an oblique angle, wherein a minimum CRA for the lens system defines a reference point for the lens system;
   a plurality of sets of optical filters overlaying at least a portion of the array, wherein each set of optical filters is associated with a set of optical sensors of the plurality of optical sensors, wherein a set of optical filters of the plurality of sets of optical filters includes a plurality of optical filters and each set of optical filters has a center wavelength for light transmitted through the set of optical filters, wherein each optical filter of the plurality of optical filters is configured to pass light in a different wavelength range, wherein at least some sets of optical filters are configured to provide a center wavelength that is higher than a center wavelength of a set of optical filters at the reference point.

20. The sensor apparatus of claim 19, further comprising:
   an interface configured to interface with the plurality of optical sensors and
      receive an output signal from the plurality of optical sensors, wherein the output signal is representative of received light from the plurality of optical sensors; and
   one or more processors adapted to:
      determine a spectral response for each set of optical sensors associated with a set of optical filters.

* * * * *